US 8,883,006 B2
Nov. 11, 2014

(12) United States Patent
Kovach et al.

(10) Patent No.: US 8,883,006 B2
(45) Date of Patent: Nov. 11, 2014

(54) FLUID TREATMENT SYSTEM

(75) Inventors: Jerome Kovach, Chagrin Falls, OH (US); Stuart L. Park, Chardon, OH (US); Peter R. Halemba, Russell, OH (US)

(73) Assignee: Kinetico Incorporated, Newbury, OH (US)

( * ) Notice: Subject to any disclaimer, the term of this patent is extended or adjusted under 35 U.S.C. 154(b) by 367 days.

(21) Appl. No.: 13/266,514

(22) PCT Filed: Apr. 28, 2010

(86) PCT No.: PCT/US2010/032773
§ 371 (c)(1),
(2), (4) Date: Oct. 27, 2011

(87) PCT Pub. No.: WO2010/127007
PCT Pub. Date: Nov. 4, 2010

(65) Prior Publication Data
US 2012/0048794 A1 Mar. 1, 2012

Related U.S. Application Data

(60) Provisional application No. 61/173,255, filed on Apr. 28, 2009, provisional application No. 61/323,965, filed on Apr. 14, 2010.

(51) Int. Cl.
B01D 63/00 (2006.01)
B01D 61/08 (2006.01)
B01D 69/04 (2006.01)
C02F 1/44 (2006.01)
C02F 1/00 (2006.01)

(52) U.S. Cl.
CPC ............. *B01D 61/08* (2013.01); *C02F 2209/03* (2013.01); *C02F 2209/02* (2013.01); *C02F* (Continued)

(58) Field of Classification Search
CPC ...... C02F 1/441; C02F 2209/02; C02F 9/005; C02F 1/44; C02F 1/442; C02F 1/444; C02F 2201/006; C02F 9/00; C02F 1/008; C02F 2209/40; C02F 2209/03; C02F 2303/16; C02F 2301/046; C02F 2301/08; B01D 61/022; B01D 61/10; B01D 61/025; B01D 61/08; B01D 65/00; B01D 2313/02; B01D 2317/04
USPC ......... 210/85, 90, 97, 194, 195.1, 252, 257.1, 210/257.2, 258, 321.6, 321.78, 321.87, 210/323.2, 340, 416.1, 433.1, 450, 455
See application file for complete search history.

(56) References Cited

U.S. PATENT DOCUMENTS 3,708,069 A 1/1973 Clark
4,629,568 A 12/1986 Ellis, III
(Continued)

FOREIGN PATENT DOCUMENTS

WO 01/47615 7/2001
WO 2009097176 6/2009

OTHER PUBLICATIONS

International Search Report and Written Opinion PCT/US10/32772; publication date Nov. 4, 2010.
(Continued)

*Primary Examiner* — John Kim
(74) *Attorney, Agent, or Firm* — Tarolli, Sundheim, Covell & Tummino LLP

(57) ABSTRACT

A fluid treatment system for treating feed water includes a first tubular member having first and second ends, at least one second tubular member having first and second ends, a pump positioned within the first tubular member, a filtering membrane positioned within the second tubular member, a first end cap for receiving the first ends of the first and second tubular members, and a second end cap for receiving the second ends of the first and second tubular members.

32 Claims, 25 Drawing Sheets

(52) U.S. Cl.
CPC . 2209/40 (2013.01); *C02F 2301/08* (2013.01); *C02F 1/008* (2013.01); C02F 1/441 (2013.01); *C02F 2301/046* (2013.01); *C02F 2303/16* (2013.01); *C02F 1/44* (2013.01)
USPC ............. 210/258; 210/85; 210/90; 210/97; 210/194; 210/195.1; 210/252; 210/257.1; 210/257.2; 210/321.6; 210/321.78; 210/321.87; 210/323.2; 210/340; 210/416.1; 210/433.1; 210/450; 210/455

(56) References Cited

U.S. PATENT DOCUMENTS

| | | | |
|---|---|---|---|
| 5,817,231 | A | 10/1998 | Souza |
| 5,860,796 | A | 1/1999 | Clausen |
| 6,423,223 | B1 | 7/2002 | Northcut et al. |
| 6,436,282 | B1 | 8/2002 | Gundrum et al. |
| 6,814,304 | B2 | 11/2004 | Onofrio |
| 6,936,160 | B2 * | 8/2005 | Moscaritolo et al. ........... 210/85 |
| 2002/0158001 | A1 | 10/2002 | Northcut et al. |
| 2007/0023347 | A1 | 2/2007 | Chabot |
| 2007/0181484 | A1 | 8/2007 | Reckin et al. |
| 2008/0105605 | A1 | 5/2008 | Kobayashi |
| 2009/0001013 | A1 | 1/2009 | Kloos et al. |

OTHER PUBLICATIONS

European Search Report for PCT/US2010032772; completed Oct. 9, 2013.

* cited by examiner

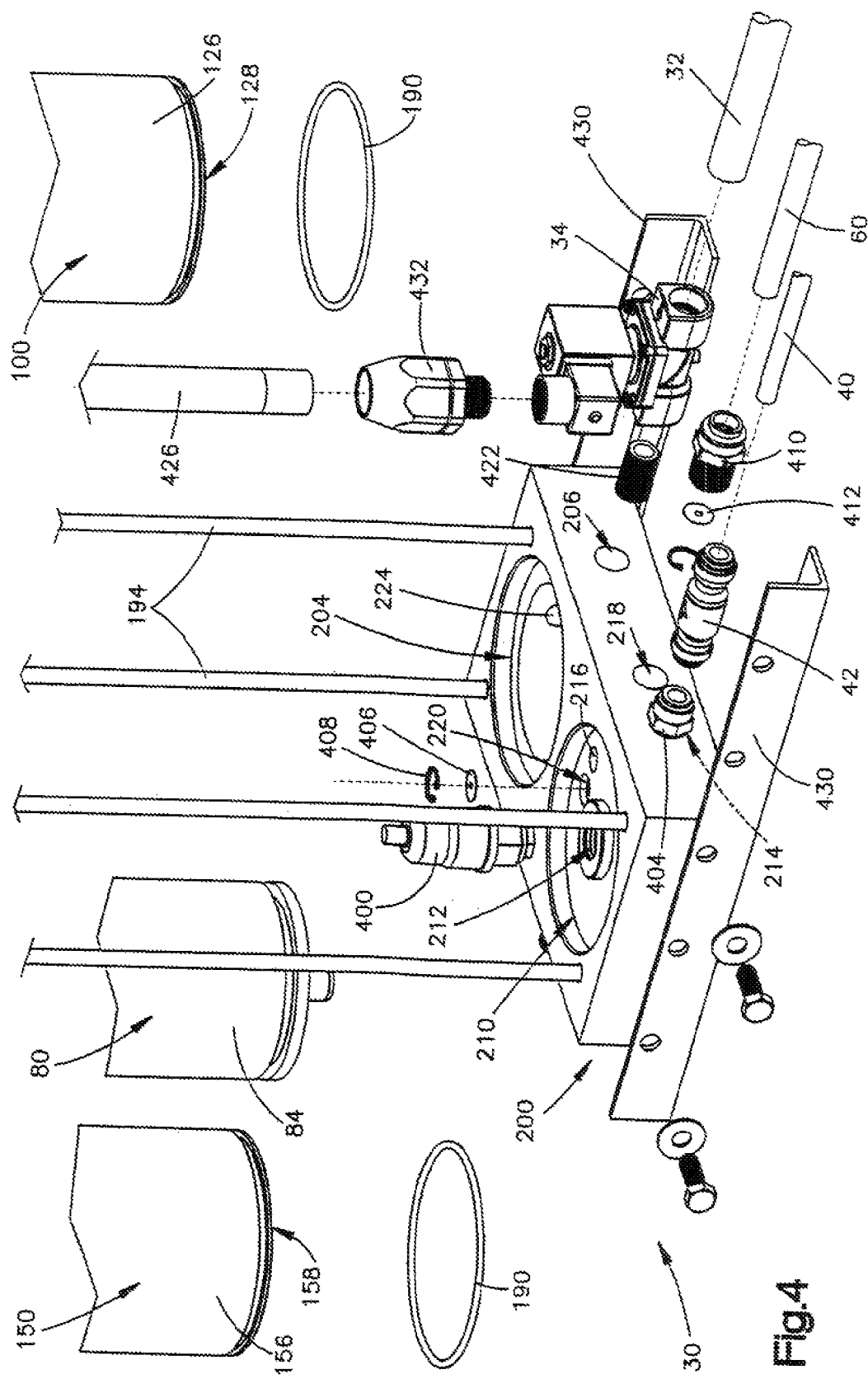

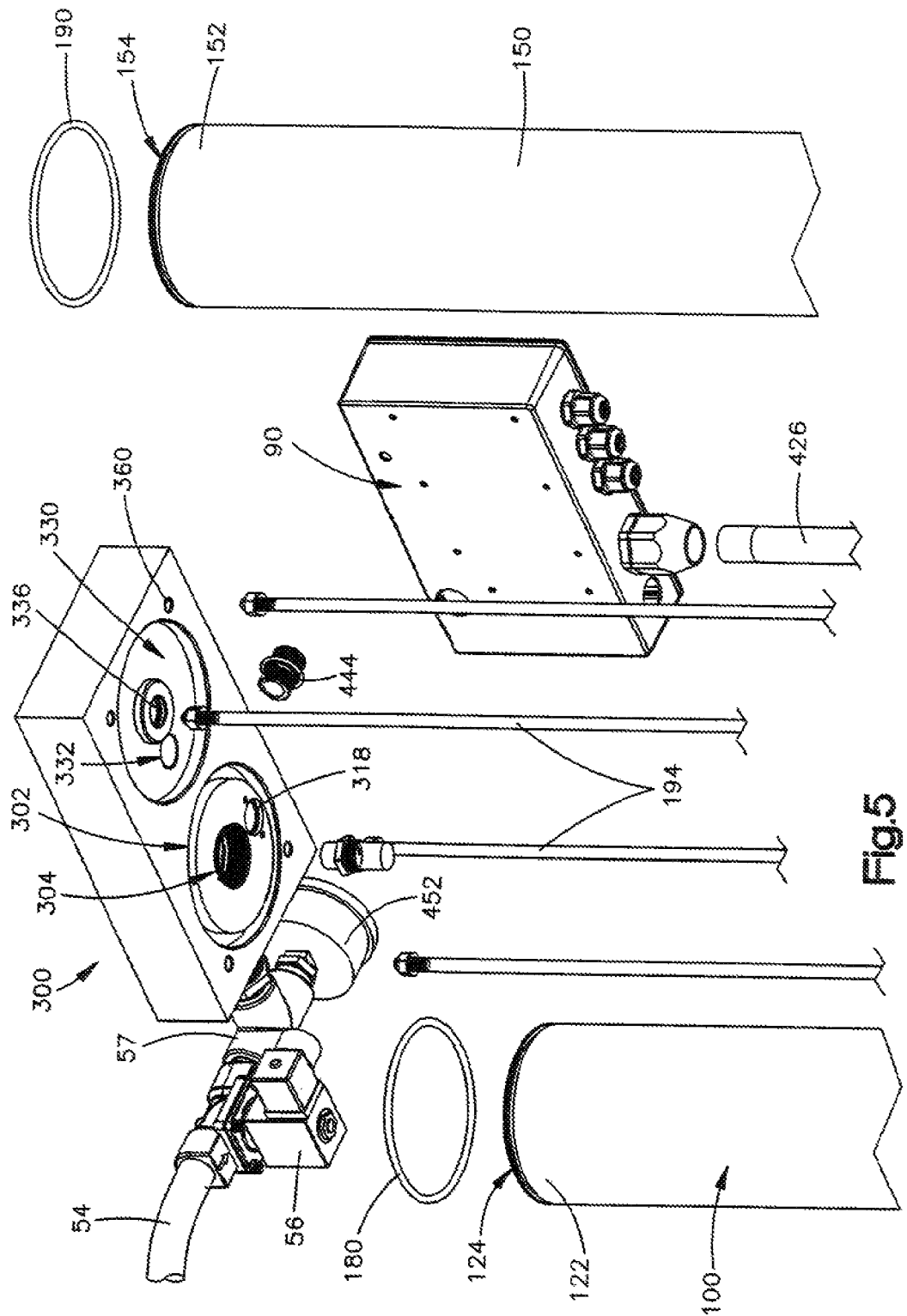

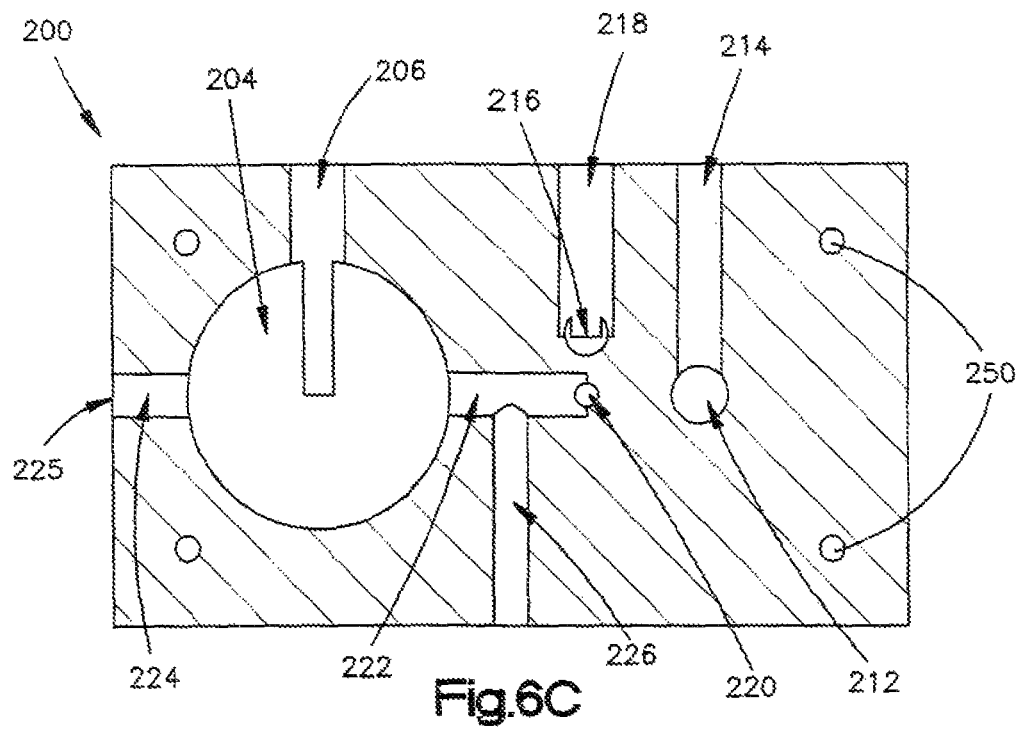
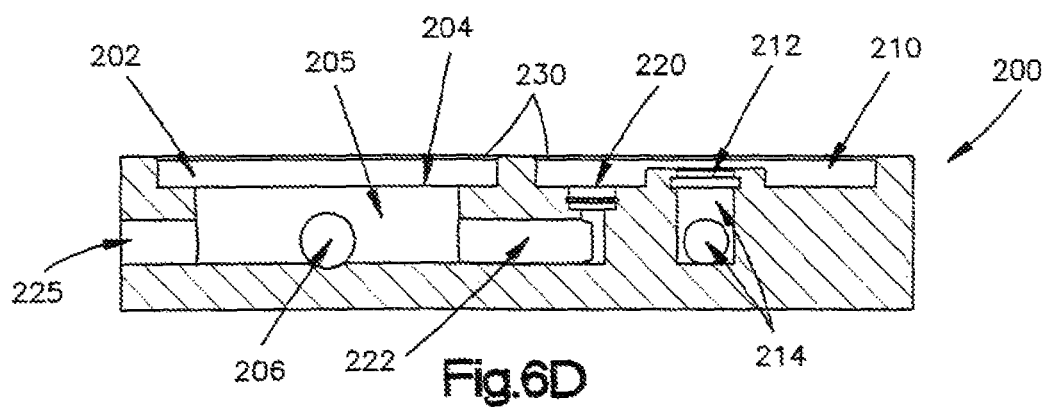

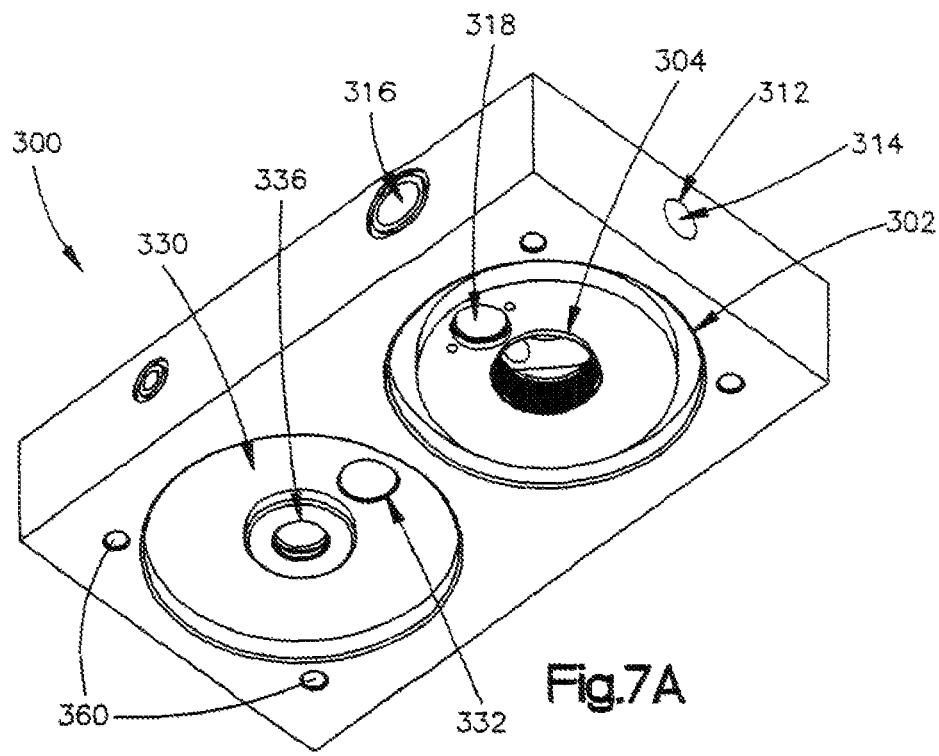
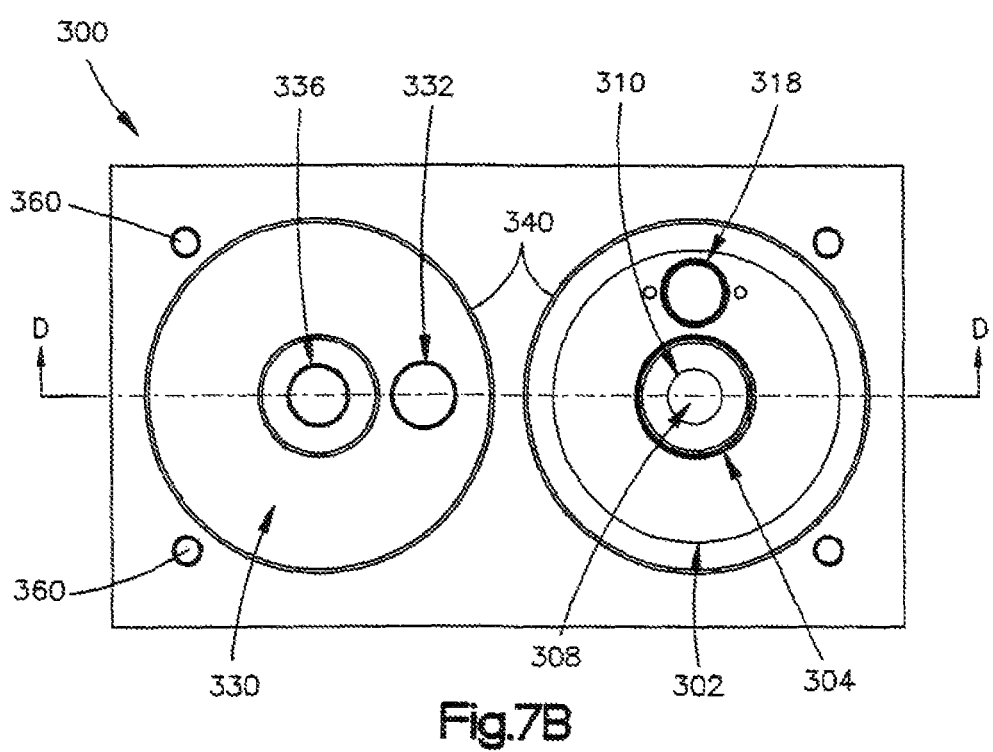

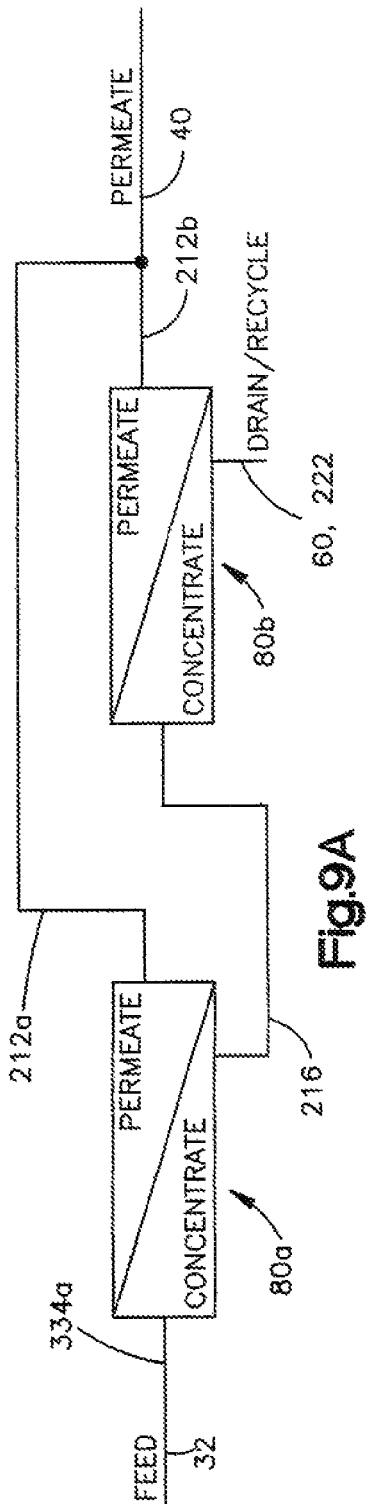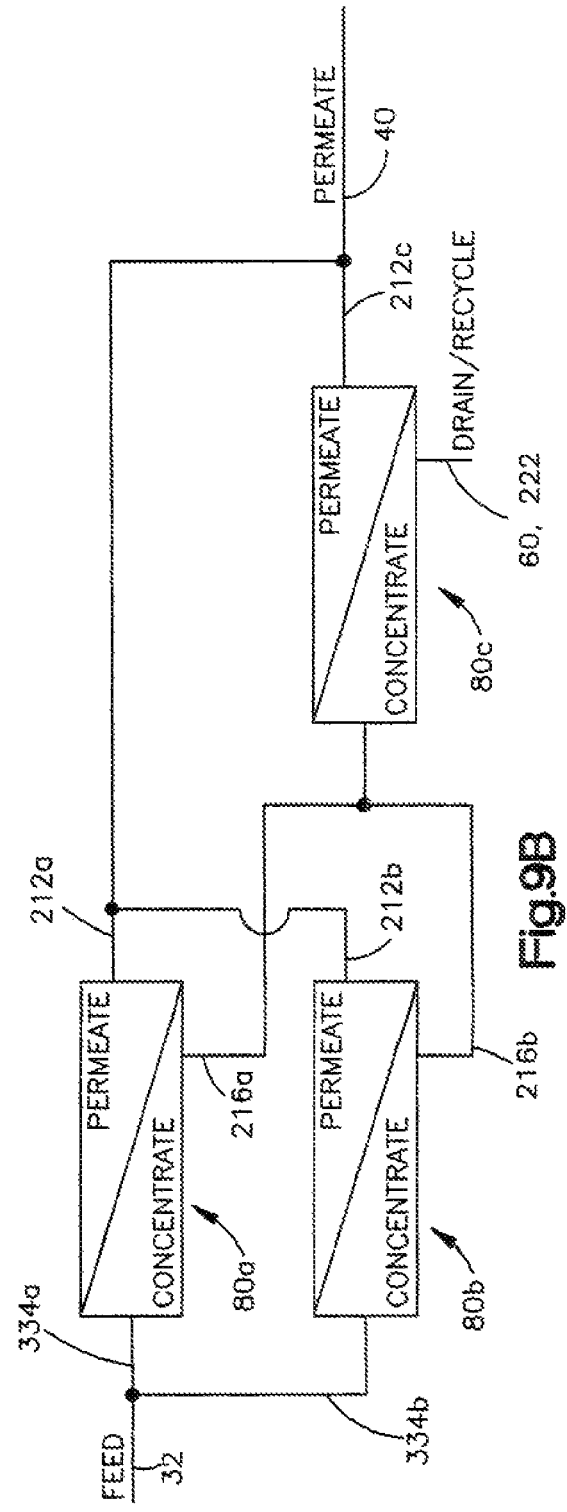

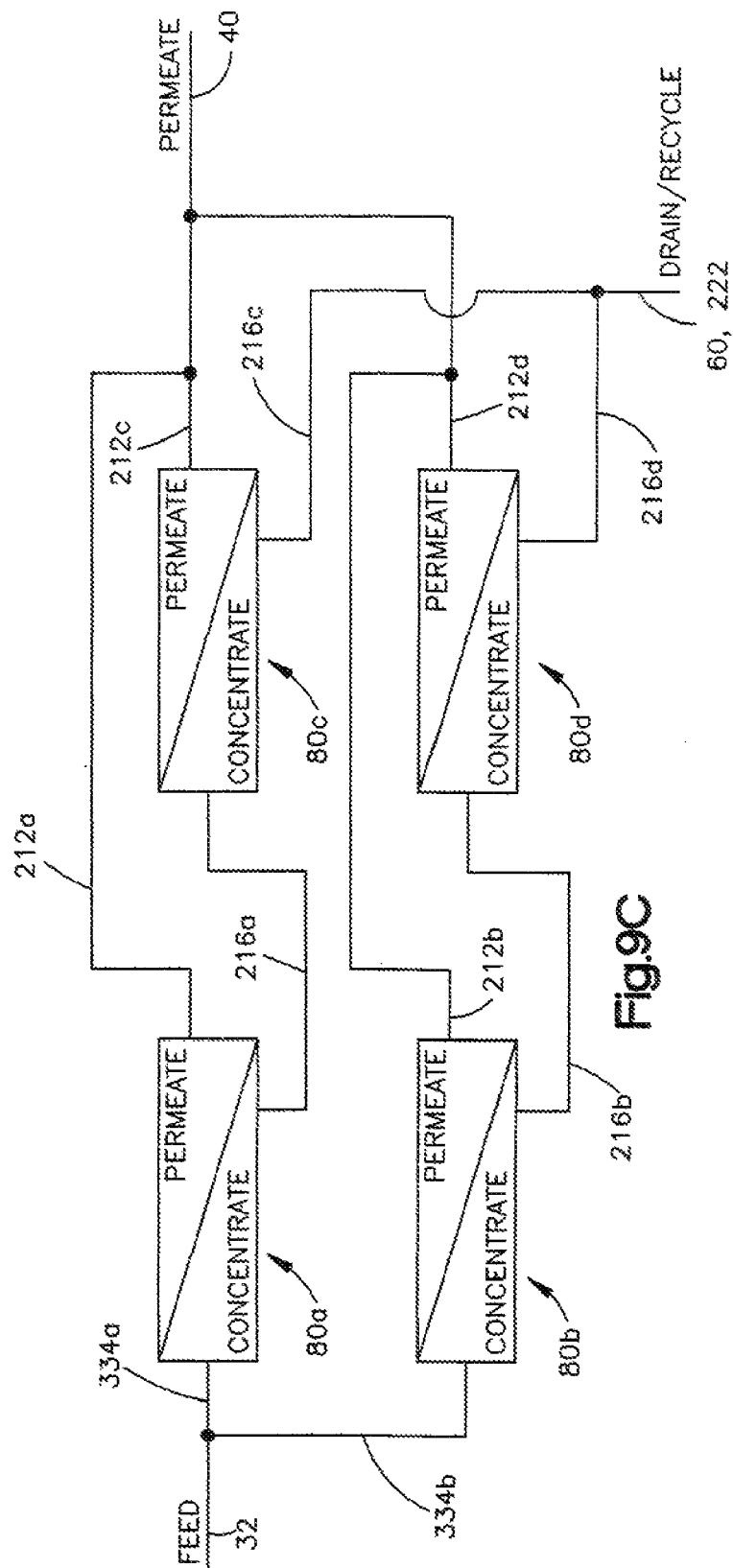

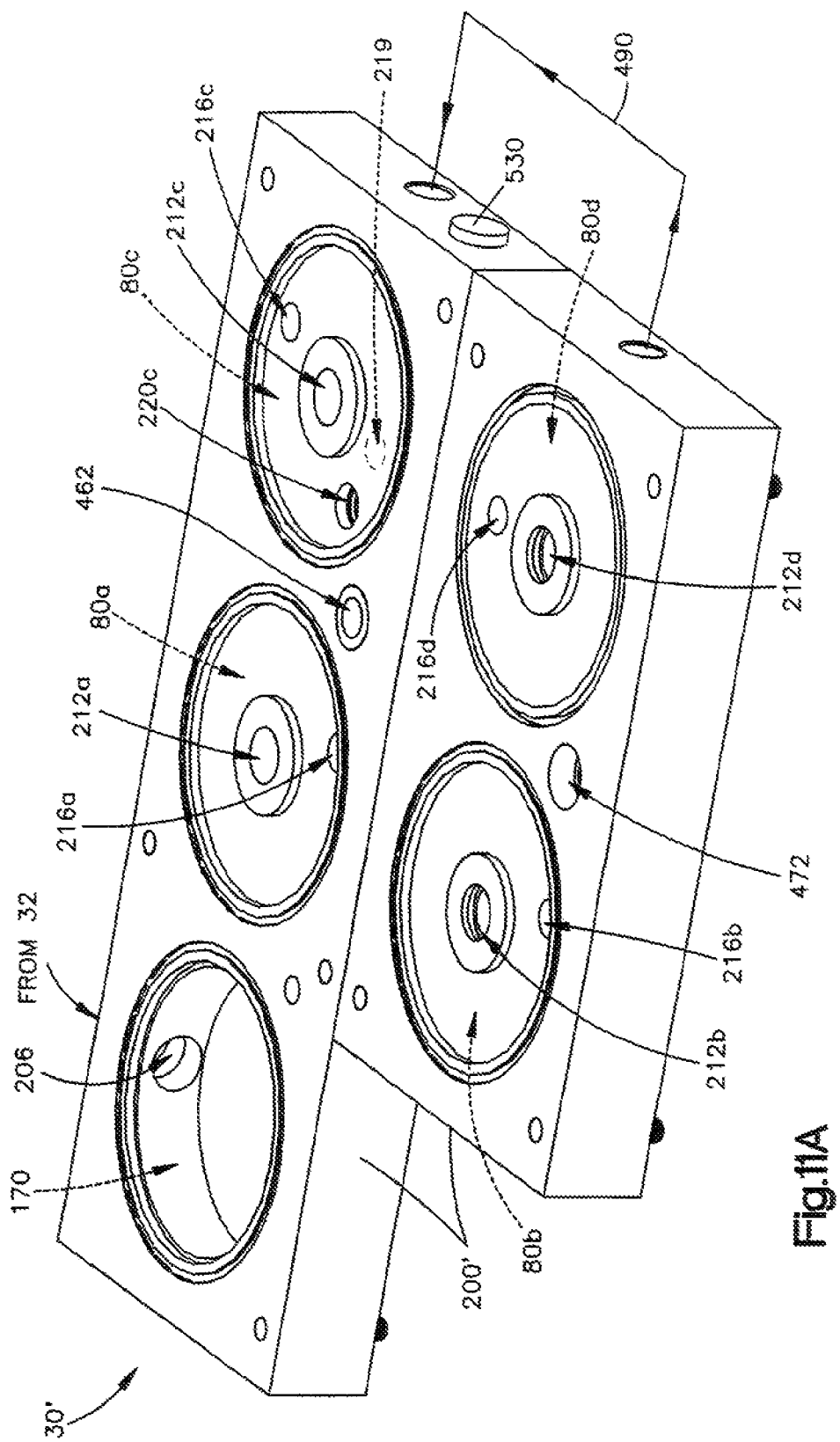

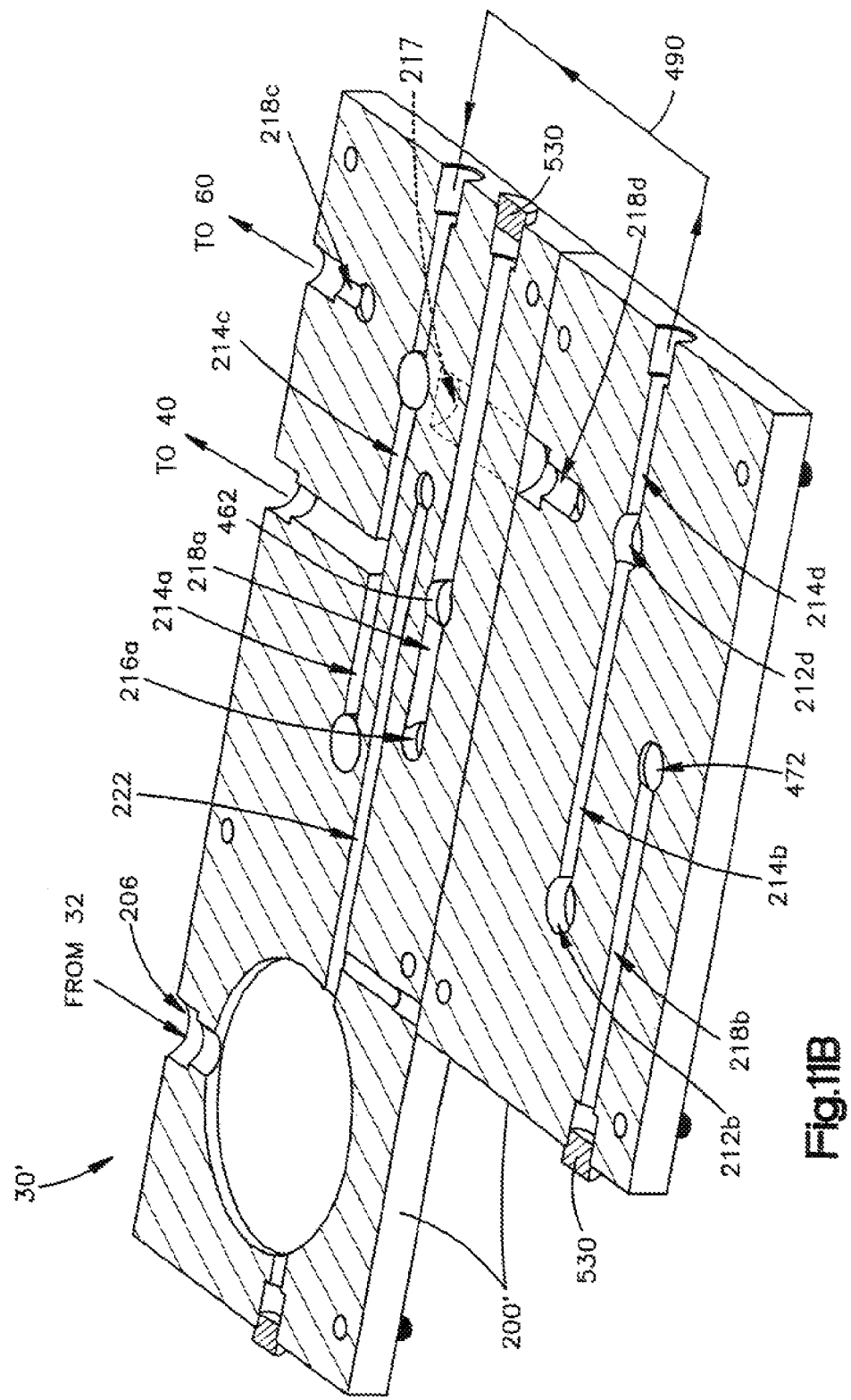

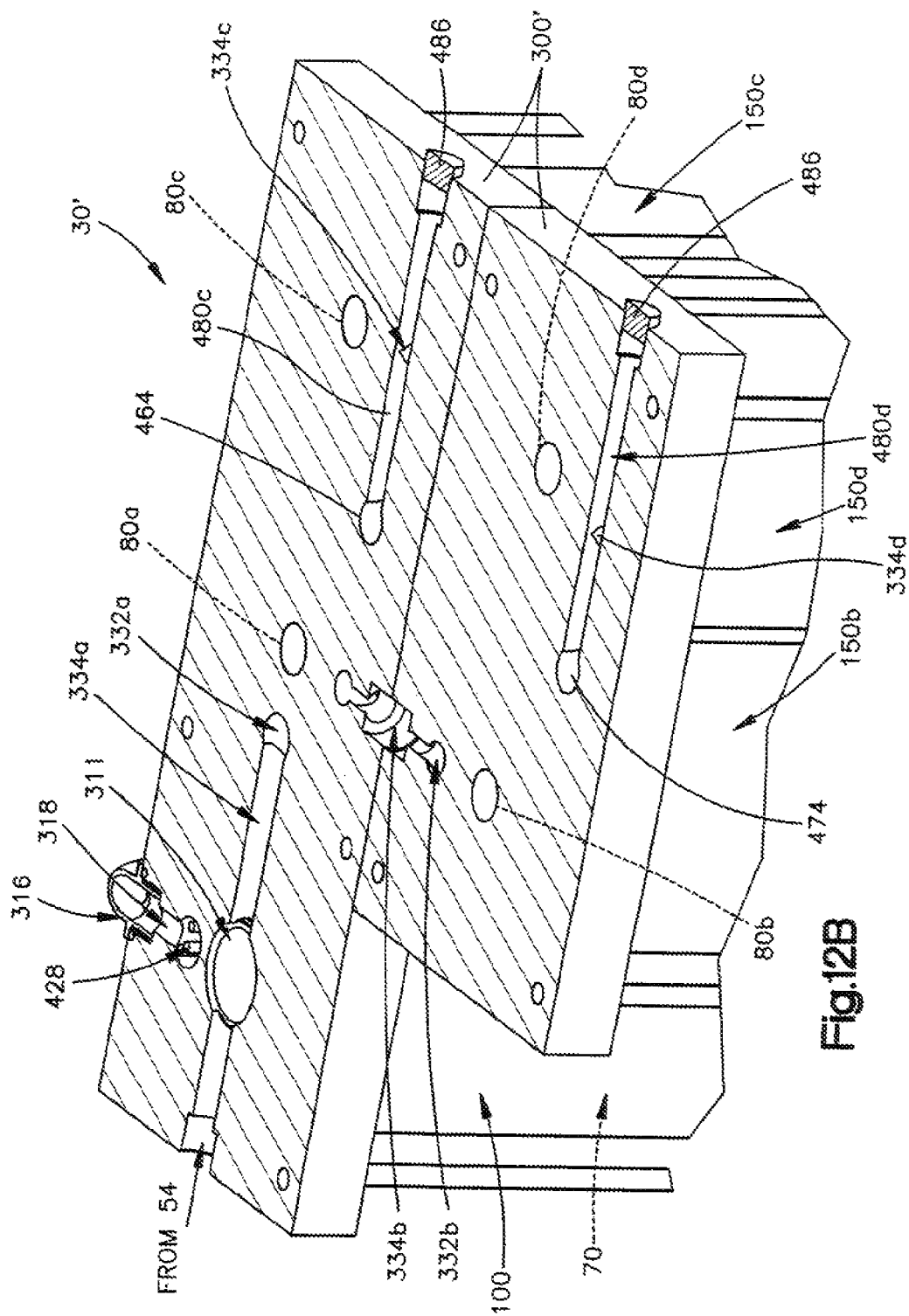

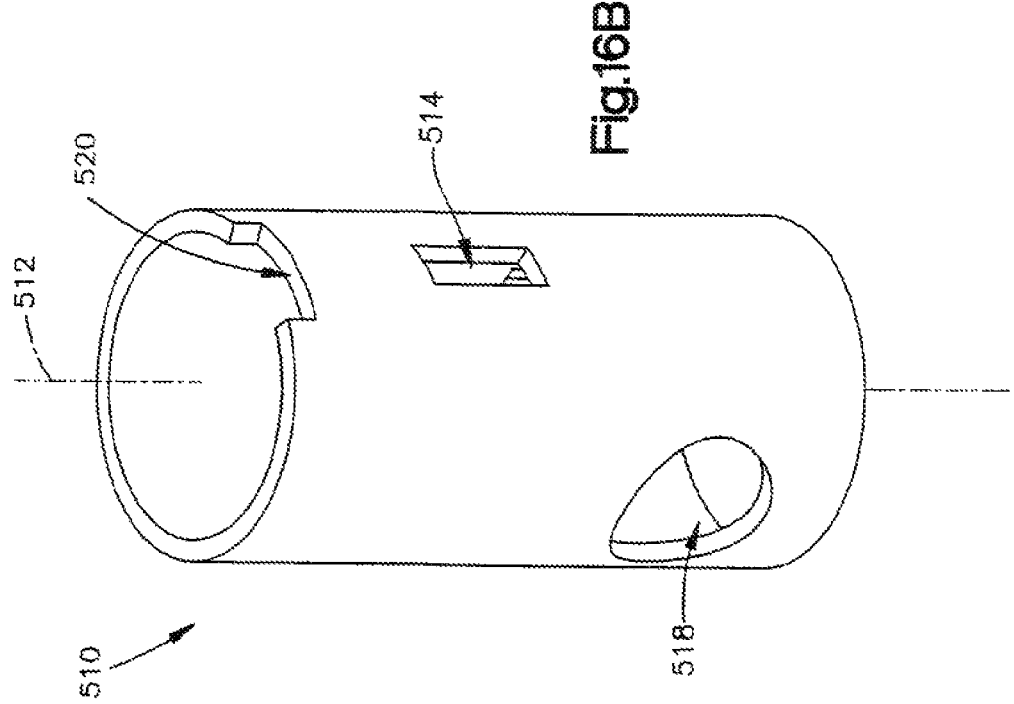
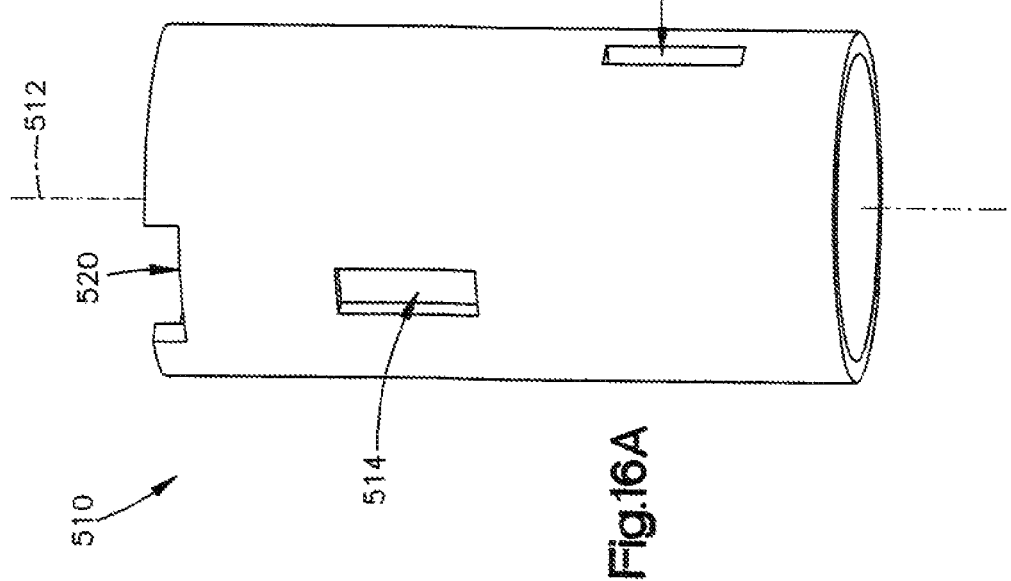

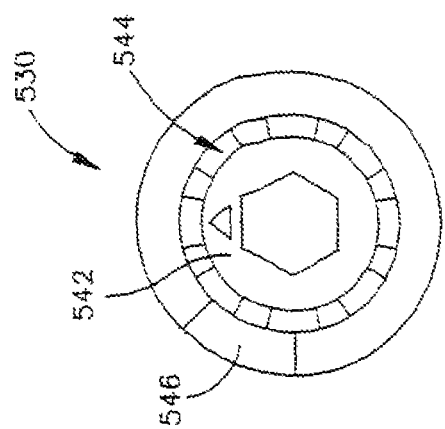
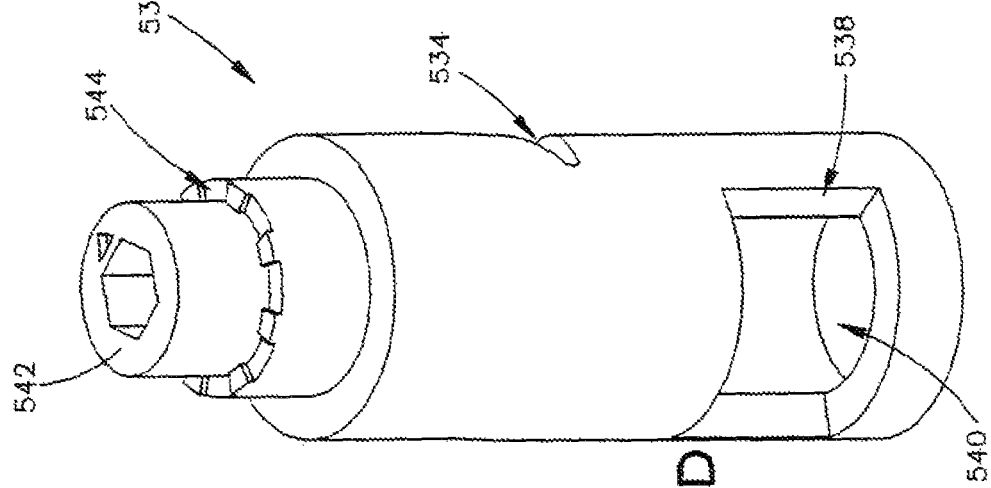
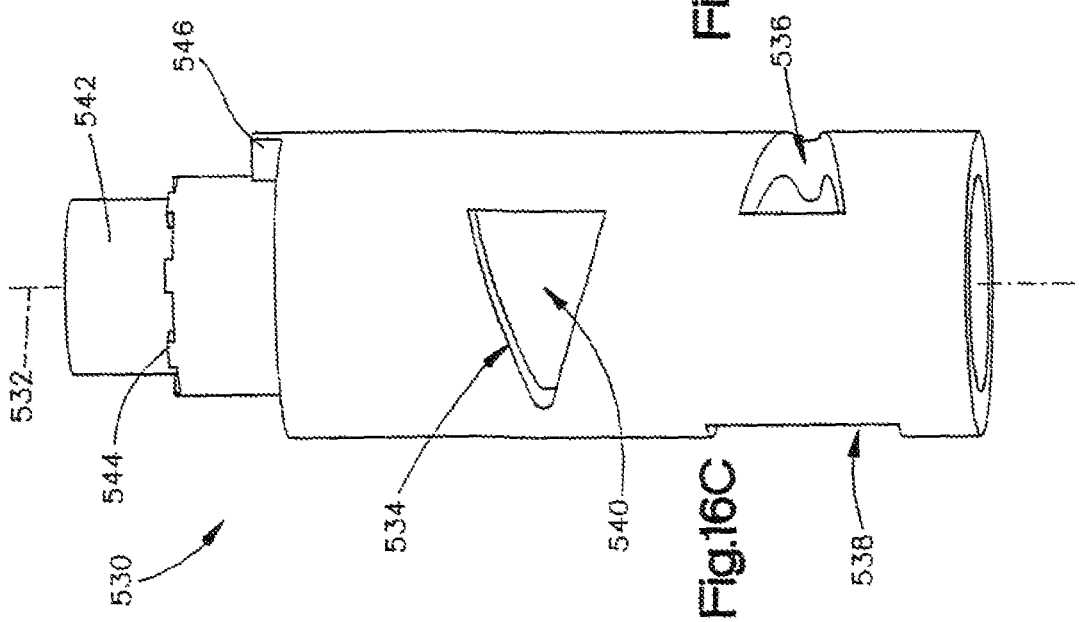

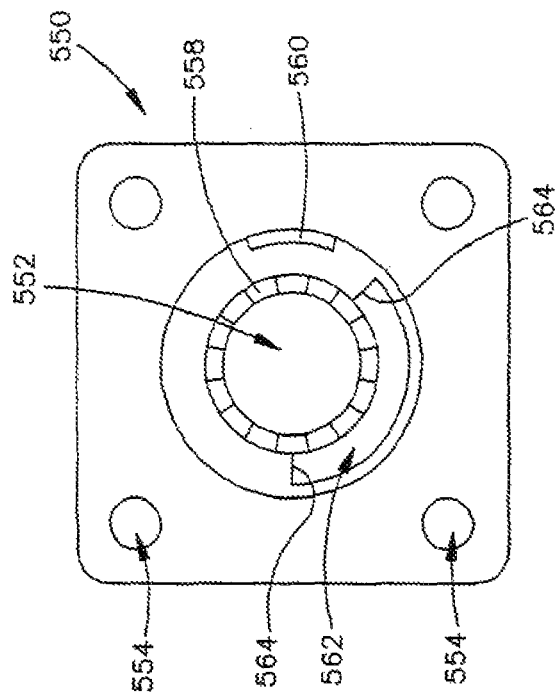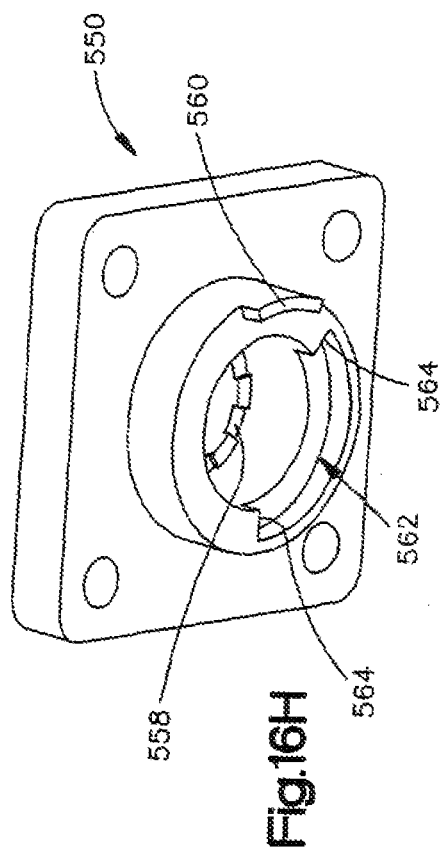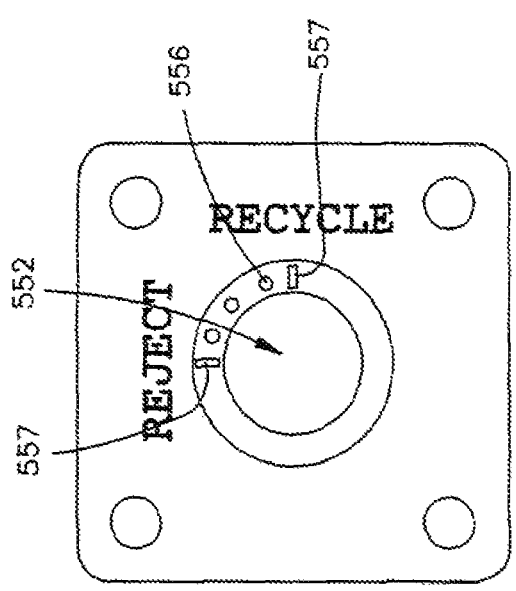
Fig.16G
Fig.16H
Fig.16F

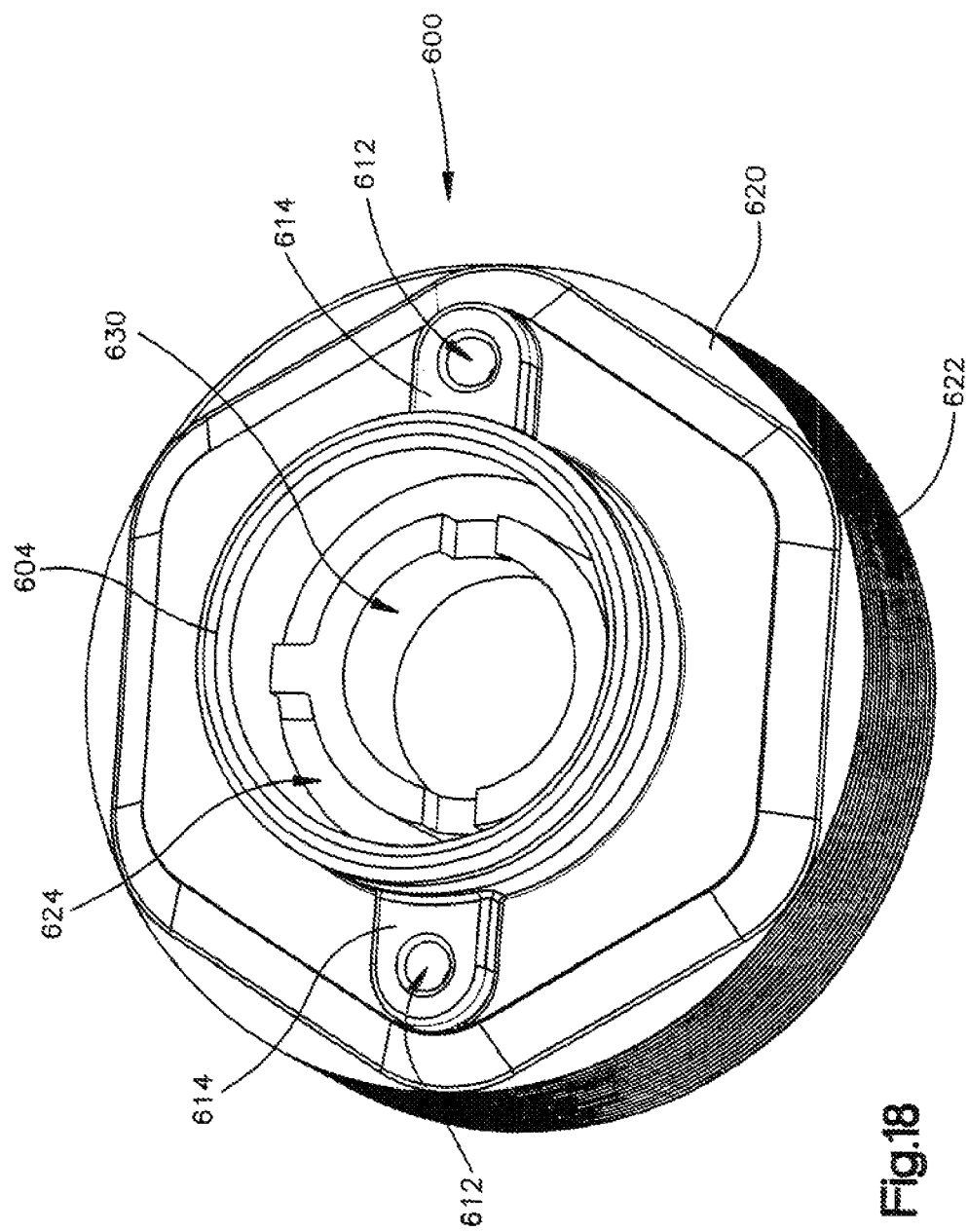

FLUID TREATMENT SYSTEM

PRIORITY

The present invention claims priority to U.S. Provisional Application Ser. Nos. 61/173,255, filed Apr. 28, 2009 and 61/323,965, filed Apr. 14, 2010, the entirety of which are incorporated herein by reference in their entirety.

TECHNICAL FIELD

The present invention relates to fluid treatment systems and, in particular, relates to a compact reverse osmosis based treatment system that occupies a small footprint and that is easily expandable.

BACKGROUND OF THE INVENTION

Various methods and apparatus are known for purifying solvents, particularly water. One such method utilizes the principle of reverse osmosis to reduce or eliminate the quantity of dissolved solids in a liquid. According to the reverse osmosis principle, a semi-permeable membrane is used to separate the solvent from the dissolved solids. For example, in purifying water, a membrane is selected that exhibits greater permeability to water than the dissolved solids carried by the water. Raw feed water is applied to the membrane at a pressure generally greater than the osmotic pressure of the water. Under pressure, water passes through the membrane leaving behind the dissolved solids. The liquid passing through the membrane is generally termed "permeate" whereas the liquid remaining on the input side of the membrane is generally termed "concentrate" and is usually discarded to a drain.

Since the concentration of the solutes increases on the concentrate side of the membrane during the reverse osmosis process precipitation of one or more of the dissolved solids can occur. This precipitation can cause plugging of the membrane, thereby lowering the efficiency of the process. To remedy this, some systems recycle a portion of the permeate back through the membrane to flush the membrane of these precipitates. One such example of a conventional fluid treatment system using a permeate flush is illustrated in U.S. Pat. No. 4,629,568 entitled "Fluid Treatment System" to Ellis III, which is herein incorporated by reference and attached hereto as an appendix.

Due to the number of products and byproducts generated by the reverse osmosis process, as well as the need to periodically flush the membrane, conventional fluid treatment systems require a multitude of plumbing connections and space to accommodate all the necessary processing and storage components. Such systems are therefore susceptible to leaks and require a large amount of space. There is therefore a need to provide a fluid treatment system that is capable of performing all the aforementioned tasks while minimizing the probability of leakage and requiring a minimal amount of space.

SUMMARY OF THE INVENTION

In accordance with an embodiment of the present invention a fluid treatment system for treating feed water includes a first tubular member having first and second ends, at least one second tubular member having first and second ends, a pump positioned within the first tubular member, a filtering membrane positioned within the second tubular member, a first end cap for receiving the first ends of the first and second tubular members, and a second end cap for receiving the second ends of the first and second tubular members.

In accordance with another aspect of the present invention a fluid treatment system includes at least one first tubular member containing a membrane filter. The first tubular member has first and second ends. A first end cap structure sealingly receives a first end of the tubular member and a second end cap structure sealingly receives a second end of the tubular member. A pump delivers water to be treated to one of the end cap structures. At least one of the end cap structures serves as a mounting for temperature and pressure sensors for monitoring the temperature and pressure of the water communicated by the pump to the one end cap structure.

In accordance with another aspect of the present invention a fluid treatment system includes a filtering membrane located within a first tubular member. The filtering membrane has an input for receiving water to be treated. A pump delivers water to be treated to the filtering membrane. The pump is located within a second tubular member. Each of the tubular members has first and second ends. The first and second ends of at least one of the tubular members are received by respective first and second end cap. At least of the end caps serves as a mounting for temperature and pressure sensors that monitor the temperature and pressure of water to be treated. The sensors communicate with associated fluid passages defined within the one end cap.

In accordance with another aspect of the present invention a fluid treatment system for treating feed water includes a first tubular member having first and second ends and a second tubular member having first and second ends. A pump is positioned within the first tubular member and a filtering membrane is positioned within the second tubular member. A first end cap receives the first end of the first tubular member and a second end cap receives the second end of the first tubular member. An adapter secures the pump to the first end cap and prevents relative rotation between the pump and the first end cap. The adapter includes a plurality of shoulders that mate with recessed portions of the first end cap.

BRIEF DESCRIPTION OF THE DRAWINGS

The foregoing and other features and advantages of the present invention will become apparent to those skilled in the art to which the present invention relates upon reading the following description with reference to the accompanying drawings, in which;

FIG. 4 is an enlarged vim of a bottom portion of the reverse osmosis unit of FIG. 3;

FIG. 5 is an enlarged view of a top portion of the reverse osmosis unit of FIG. 3;

FIG. 6C is a section view of the bottom plate of FIG. 6A;

FIG. 6D is a section view of the bottom plate of the reverse osmosis unit of FIG. 6A taken along line D-D;

FIG. 7A is a perspective view of a top plate of the reverse osmosis unit of FIG. 3;

FIG. 7B is a top view of the top plate of FIG. 7A;

FIG. 9A is a schematic illustration of an alternative embodiment of the fluid treatment system in accordance with the present invention;

FIG. 9B is a schematic illustration of another embodiment of the fluid treatment system in accordance with the present invention;

FIG. 9C is a schematic illustration of another embodiment of the fluid treatment system in accordance with the present invention;

FIG. 11A is a section view of the reverse osmosis unit of FIG. 10 taken along line 11A-11A;

FIG. 11B is a section view of the reverse osmosis unit of FIG. 10 taken along line 11B-11B;

FIG. 12B is a section view of the reverse osmosis unit of FIG. 10 taken along line 12B-12B;

FIGS. 16A-B illustrate an outer sleeve of the adjustable flow control element of FIG. 15;

FIGS. 16C-E illustrate an inner sleeve of the adjustable flow control element of FIG. 15;

FIGS. 16F-H illustrate a flange of the adjustable flow control element of FIG. 15;

FIG. 18 is a schematic illustration of an adapter for use in the pressure end cap of FIG. 17.

DETAILED DESCRIPTION

Figure 1:
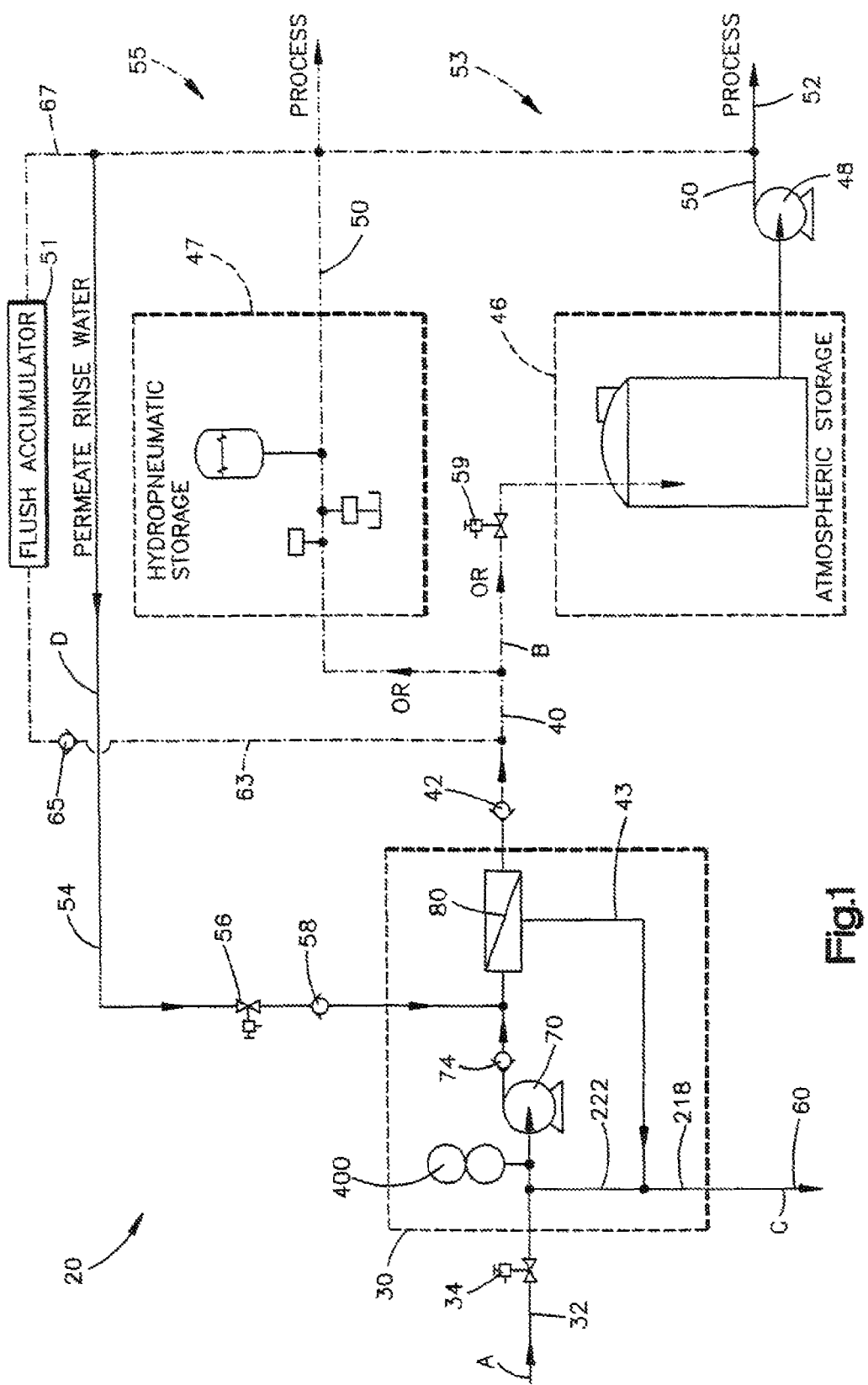
FIG. 1 is a schematic illustration of a fluid treatment system in accordance with the present invention.

The present invention relates to fluid treatment systems and, in particular, relates to a fluid treatment system that has multi-function end caps, FIG. 1 illustrates a fluid treatment system 20 in accordance with the present invention. The system includes a reverse osmosis (R/O) unit 30 connected to an input conduit or feed conduit 32 through which feed water to be purified is communicated to the R/O unit. The R/O unit 30 also communicates with output conduits 40 and 43 through which "permeate" and "concentrate" are discharged, respectively, from the R/O unit. The R/O unit 30 includes a pump 70 for pumping the feed water through the R/O unit and a semi-permeable membrane 80 for processing the feed water into concentrate and permeate. The membrane 80 may constitute an R/O membrane or a nanofiltration membrane. According to the reverse osmosis principle, feed water supplied through the feed conduit 32 as indicated by arrow A is applied to the membrane 80 at a pressure greater than the osmotic pressure. Water passes through the membrane 80 and becomes permeate that is released into the permeate conduit 40 as indicated by arrow B while dissolved solids in the feed water remain on the application side of the membrane and are eventually discharged from the concentrate conduit 43 and into a drain conduit 60 as indicated by arrow C.

As shown in FIG. 1, raw feed water is fed to the R/O unit 30 through the feed conduit 32. A valve, such as a solenoid valve 34 controls fluid communication between the feed conduit 32 and the R/O unit 30. A drain opening 218 in the R/O unit 30 directs the concentrate out of the R/O unit and to the drain conduit 60, where the concentrate flows, to a drain or waste (not shown). A valve, such as a solenoid valve (not shown), or other flow regulating structure, may control fluid communication between the R/O unit 30 and the drain conduit 60. Alternatively, the concentrate may be fed to at least one more membrane (not shown) in serial and/or parallel connection with the membrane 80 in order to process the feed water in a cascading fashion.

A permeate check valve 42 controls fluid communication between the R/O unit 30 and the permeate conduit 40. The permeate check valve 42 allows fluid to flow from the R/O unit 30 to the permeate conduit 40 but prevents reverse flow. The permeate conduit 40 connects the R/O unit 30 to an atmospheric storage tank 46 or a pressurized storage tank 47. For purposes of illustration, it is presumed that the permeate conduit 40 connects the R/O unit 30 to the atmospheric storage tank 46. The permeate check valve 42 between the R/O unit 30 and the permeate conduit 40 therefore controls fluid communication between the R/O unit and the storage tank 46. The atmospheric storage tank 46 stores permeate exiting the R/O unit 30. A supply conduit 50 provides fluid communication between the storage tank 46 and a process demanding permeate, such as a faucet 52. A pump 48 maintains the permeate in the supply conduit 50 under pressure.

A permeate rinse conduit 54 taps into the supply conduit 50 and fluidly connects the storage tank 46 back to the R/O unit 30. A permeate rinse valve, such as a solenoid valve 56, controls fluid communication between the storage tank 46 and the R/O unit 30 through the rinse conduit 54. A check valve 58 allows fluid to flow from the storage tank 46 to the R/O unit 30 but prevents reverse flow.

A controller 90 (not shown, see FIG. 2) in the RD wilt 30 controls operation of the inlet valve 34 and the rinse valve 56 as well as operation of the pump 70. In operation, when it is desirable for fluid treatment to begin, the controller 90 activates the pump 70 and opens the inlet valve 34 to allow feed water to enter the R/O unit 30 through the feed conduit 32 as indicated at A. The feed water may be supplied by an external source (not shown) that supplies the feed water under pressure at about 50-70 psi. The pump 70 forces the feed water through the semi-permeable membrane 80 via reverse osmosis, thereby separating the teed water into concentrate and permeate. Flow regulating discs 406 and 412 in the R/O unit 30 restrict the flow of fluid through the R/O unit, thereby creating the necessary back pressure required to perform reverse osmosis on the feed water.

A low feed pressure switch 400 monitors the pressure of the feed water entering the R/O unit 30 via the feed conduit 32. If the feed pressure falls below a predetermined amount, the controller 90 deactivates the pump 70 and turns off the inlet valve 34, thereby shutting down the R/O unit 30. As long as the inlet valve 34 remains open and the pump 70 remains activated, the permeate is forced out of the R/O unit 30 through the permeate check valve 42 and into the permeate conduit 40. The permeate flows through the conduit 40 in the direction B and into the storage tank 46 where it is collected. Permeate also fills the supply conduit 50 and the rinse conduit 54. Since the rinse valve 56 is closed, the pump 48 maintains the permeate under pressure within the supply conduit 50 and the rinse conduit 54. Once the supply conduit 50 and the rinse conduit 54 are filled with pressurized permeate, the storage tank 46 begins to fill with permeate.

The volume of the storage tank 46 is monitored by the controller 90 via a switch, such as a float switch positioned within the tank 46. When the volume of the storage tank 46 reaches a predetermined level or it is otherwise no longer necessary to generate more permeate, the controller 90 closes the inlet valve 32 and deactivates the pump 70 to cease the flow of feed water into the R/O unit 30. The controller 90 concurrently opens the rinse valve 56.

Since the permeate in the supply conduit 50 and the rinse conduit 54 is under pressure, opening the rinse valve 56 causes the permeate within the rinse conduit, the supply conduit and the storage tank 46 to pass through the rinse valve, the check valve 58, and into the R/O unit 30 as indicated by arrow D. In the case of the pressurized storage tank 47, the pump 48 is omitted and the pressure within the tank forces the stored permeate through the rinse conduit 54. In either case, permeate enters the R/O unit 30 and is flushed though the membrane 80 for a predetermined time to remove built up particulates and debris, thereby promoting longevity of the membrane. The controller 90 then closes the rinse valve 56 to cease permeate flow from the rinse conduit 54. The inlet valve 32 can then be opened and the pump 70 activated to reinitiate the fluid treatment process. This process can be repeated as required or desired.

Instead of using the pressurized storage tank 47 or the storage tank 46 to flush the membrane 80, a separate flush accumulator 51 or storage tank may be provided. A fluid connection 63 having a check valve 65 fluidly connects the flush accumulator 51 with the permeate conduit 40 in order to fill the flush accumulator with permeate exiting the R/O unit 30. A fluid connection 67 fluidly connects an output of the flush accumulator 51 with the rinse conduit 54 leading to back to the R/O unit 30.

A valve 59 on the permeate conduit 40 leading to the storage tank 46 is operable to prevent permeate from entering the storage tank while cooperating, with the check valve 65 to pressurize the flush accumulator 51. When the flush accumulator 51 supplies pressurized permeate to flush the membrane 80, portions of the supply conduit 50, illustrated by phantom arrows 53 and 55, extending from the storage tanks 46 and 47, respectively, are omitted or isolated from the fluid connection 67 on the flush accumulator 51.

Figure 2:
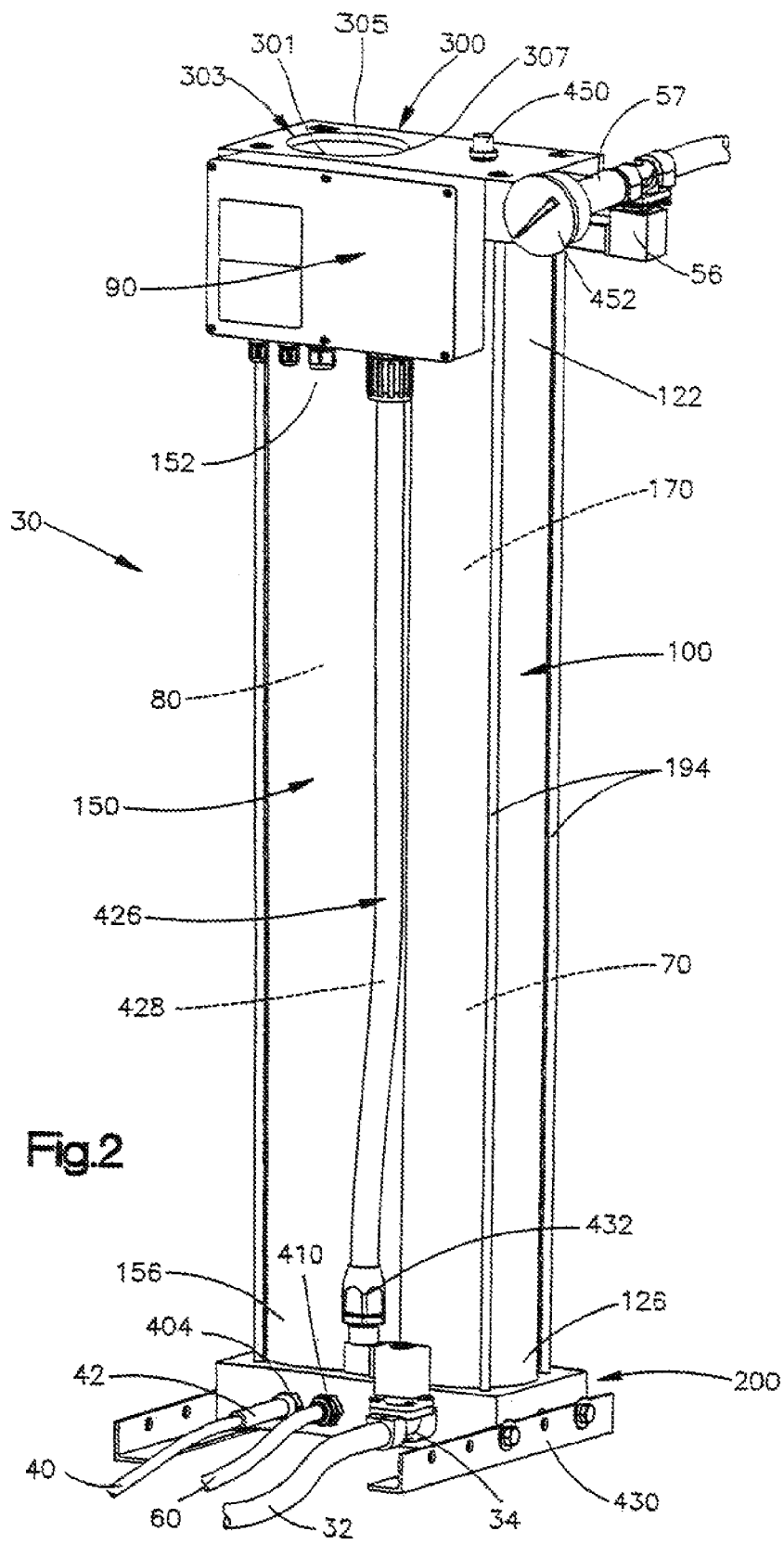
FIG. 2 is a schematic illustration of a reverse osmosis unit of the fluid treatment system of FIG. 1.
Figure 3:
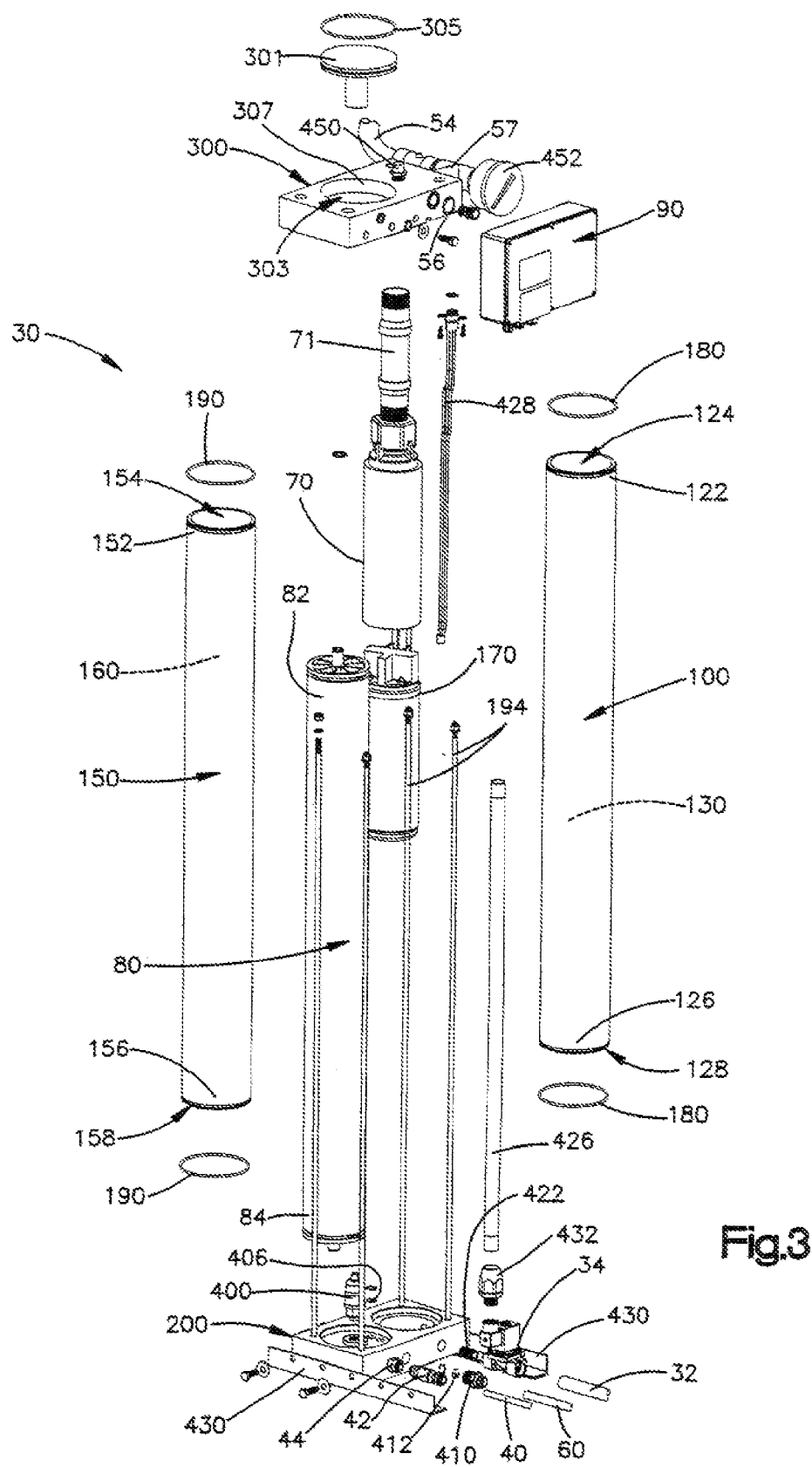
FIG. 3 is an exploded assembly view of the reverse osmosis unit of FIG. 2.

FIGS. 2-5 illustrate the R/O unit 30 in accordance with the present invention. As shown in FIGS. 2-3, the R/O unit 30 includes a first tube 100 and a second tube 150. The first tube 100 includes a first end 122 that has an opening 124 and a second end 126 that has an opening 128. A passage 130 extends the length of the first tube 100 and connects the opening 124 in the first end 100 to the opening 128 in the second end 126. The second tube 150 includes a first end 152 that has an opening 154 and a second end 156 that has an opening 158. A passage 160 extends the length of the second tube 150 and connects the opening 154 in the first end 152 to the opening 158 in the second end 156. The first tube 100 and the second tube 150 may have any shape such as, for example, circular, square, rectangular, triangular, etc. The first tube 100 and the second tube 150 may be constructed of metals, plastics or combinations thereof.

The pump 70 is used to force the feed water through the R/O unit 30 and is sized to fit within the passage 130 of the first tube 100. The pump 70 may be a submersible ground water well pump and is connected to a motor 170 that supplies power to the pump. A flexible coupler 71 connected to the pump 70 helps to secure the pump within the R/O unit 30 and absorbs pump starting torque and loads experienced during shipment of the R/O unit. The motor 170 is also sized to fit within the passage of the first tube 100. The pump 70 and the motor 170, however, do not occupy the entire passage 130 of the first tube 100 to allow feed water to be collected within the first tube.

The membrane 80 used for processing feed water into permeate and concentrate is sized to fit within the passage 160 of the second tube 150. The membrane 80 has a generally rolled, cylindrical shape and includes a first end 82 and a second end 84. The membrane 80, however, does not occupy the entire passage 160 of the second tube 150 to allow incoming feed water to collect within the second tube. The membrane 80 may constitute any conventional membrane commonly used in reverse osmosis units. Alternatively or additionally, the membrane 80 may use a nanofiltration element in order to, for example, desalinate the fed water.

In conventional fluid treatment systems, the reverse osmosis membrane and the pump supplying feed water are provided in separate, spaced apart units requiring additional plumbing connections and floor space. Since both the pump 70 and the membrane 80 of the present invention can be housed in compact tubes 100 and 150 within the same R/O unit 30, respectively, the present invention provides a very small footprint which is beneficial in both commercial and residential applications. The present invention also eliminates the need for additional plumbing connections between the membrane 80 and the pump 70. Furthermore, since the pump 70, the motor 170 for operating the pump, and the membrane 80 are provided in two adjacent, tubes 100 and 150 in fluid communication with one another, any heat generated by the motor during operation of the fluid treatment system 20 is transferred to the feed water, which improves the permeate production rate.

A suction end cap 200 receives and retains the second ends 126 and 156 of the first and second tubes 100 and 150, respectively, and a pressure end cap 300 receives and retains the first ends 122 and 152 of the first and second tubes, respectively. When the suction end cap 200 and the pressure end cap 300 are secured to the first and second tubes 100 and 150, the pump 70 and the motor 170 become retained within the first tube and the membrane 80 becomes retained within the second tube. An O-ring 180 is provided at the first end 122 and the second end 126 of the first tube 100 in order to fluidly the seal the first tube with the pressure end cap 300 and the suction end cap 200. Likewise, an O-ring 190 is provided at the first end 152 and the second end 156 of the second tube 150 in order to fluidly the seal the second tube with the pressure end cap 300 and the suction end cap 200.

A plurality of support rods 194 extend between the suction end cap 200 and the pressure end cap 300. The support rods 194 are positioned around both the first tube 100 and the second tube 150 and help stabilize the R/O unit 30. A plurality of rails 430 may be secured to the suction end cap 200 in order to give the R/O unit 30 stability when standing on the floor. Alternatively, the rails 430 may be omitted and wall mount brackets may be secured to the suction end cap 200 and the pressure end cap 300 to mount the R/O unit 30 to the wall.

The R/O unit 30 may be protected by a removable cover (not shown) that extends over the pressure end cap 300. The cover may be made of a durable material, such as a polymer, and may include openings or other structure for vertically or horizontally mounting the cabinet and, thus, the R/O unit 30. A plurality of feet or rolling casters may be secured to the suction end cap 200 or the cover.

The suction end cap 200 provides an efficient means to route and distribute all fluid flow into, e.g., feed water and permeate rinse water, and out of, e.g., concentrate and permeate, the R/O unit 30 while minimizing plumbing connections and, thus, the likelihood for leakage in the R/O unit. In particular, the inlet valve 34 for controlling the flow of feed water into the R/O unit 30 the suction end cap 200 by a nipple 422 and the feed conduit 32 is coupled to the inlet valve. The pressure switch 400 for monitoring the pressure of the incoming feed water is also mounted to the suction end cap 200. Alternatively, the inlet valve 34 is mounted in a portion of the suction end cap 200 (not shown).

The drain fitting 410 for directing concentrate from the R/O unit 30 is also mounted to the suction end cap 200 and the drain conduit 60 is coupled to the drain fitting. If a valve is provided for regulating the concentrate flow to the drain conduit 60 the valve may be mounted in a portion of the suction end cap 200 (not shown). A flow regulating disc 412 regulates the flow of concentrate through the drain fitting 410 and out of the suction end cap 200 and thereby helps to create the back pressure in the R/O unit 30 required to perform reverse osmosis. The permeate check valve 42 for controlling the flow of permeate out of the R/O unit 30 is connected to the suction end cap 200 by a fitting 404 and the permeate conduit 40.

The controller 90 for controlling the inlet valve 34, the pump 70, and the rinse valve 56 is mounted to the pressure end cap 300 by a nipple 444. Alternatively, the rinse valve 56 is mounted in a portion of the pressure end cap 300 (not shown). A first wiring harness (not shown) is disposed within an electrical conduit 426 that extends from the controller 90 and is connected to the inlet valve 34 by a fitting 432. The first wiring harness electrically connects the controller 90 to the inlet valve 34 to enable the controller 90 to control the inlet valve. A second wiring harness 428 extends from the pump motor 170 to the controller 90 to enable the controller to control the motor and thus, control the pump 70. A temperature switch 450 for monitoring the temperature of the feed water is also mounted to the pressure end can 300. Furthermore, a pressure gauge 452 for monitoring the pressure of the feed water flowing between the pump 70 and the membrane 80 as well as the permeate rinse valve 56 controlling the flow of permeate rinse into the R/O unit 30 from the rinse conduit 54 are secured via fittings 57 to the pressure end cap 300.

FIGS. 6A-D illustrate the suction end cap 200 in accordance with the present invention. The suction end cap 200 has a generally rectangular shape and is constructed of any substantially rigid material such as metal, plastic or combinations thereof. The suction end cap 200 includes a first recess 202 for receiving the second end 126 of the first tube 100 and a second recess 210 thr receiving the second end 156 of the second tube 150. The first recess 202 and the second recess 210 are positioned on the same side of the suction end cap 200. The first recess 202 and the second recess 210 may be circular in shape or otherwise constructed to accommodate the second end 126 of the first tube 100 and the second end 156 of the second tube 150, respectively. A chamfer 230 extends around, and is coaxial with, each oldie first and second recesses 202 and 210. The chamfer 230 around the first recess 202 guides the second end 126 of the first tube 100 and the O-ring 180 into the first recess to provide the sealed connection between the first recess and the second end of the first tube. The chamfer 230 around the second recess 210 guides the second end 156 of the second tube 150 and the O-ring 190 into the second recess to provide the sealed connection between the second recess and the second end of the second tube.

The first recess 202 includes a feed opening 204 that places the first recess in fluid communication with a blind passage 205 that extends away from the first recess to a feed passage 206 extending through a peripheral side of the suction end cap 202. In other words, together the blind passage 205 and the feed passage 206 may have a substantially L-shaped pathway through the suction end cap 200. The feed opening 204, the blind passage 205, and the feed passage 206 may be circular in shape or may have an alternative shape such as triangular, rectangular, square, etc. The feed passage 206 receives the nipple 422 connected to the inlet valve 34.

Accordingly, when the inlet valve 34 is open, feed water flows from the feed conduit 32 and through the inlet valve into the suction end cap 200 via the feed passage 206. The feed water then flows through the feed passage 206, the blind passage 205, the feed opening 204, and finally into the first recess 202. This causes the first tube 100 to fill with feed water from the second end 126 towards the first end 122, thereby submerging the pump 70 and the motor 170. The O-rings 180 prevent feed water from leaking out of the first tube 100 while the pump 70 and the motor 170 are submerged. It is the feed water supplied by the feed conduit 32 and collected in the first tube 100 that is pumped by the pump 70 to the membrane 80 to undergo reverse osmosis.

The second recess 210 includes a permeate opening 212 that places the second recess in fluid communication with a permeate passage 214 that extends away from the second recess and through a peripheral side of the suction end cap 200. In other words, the permeate passage 214 ma have a substantially L-shaped pathway through the suction end cap 200. The permeate opening 212 and the permeate passage 214 may be circular in shape or may have an alternative shape such as triangular rectangular, square, etc. The second recess 210, the permeate opening 212, and at least a portion of the permeate passage 214 are sized to accommodate the membrane 80.

The permeate passage 214 receives the permeate fitting 404 connected to the permeate conduit 40 and the check valve 42. Accordingly, when the inlet valve 34 is open and the pump 70 is activated, feed water is pumped from the pomp to the membrane 80. The feed water then undergoes reverse osmosis, allowing permeate to pass through the membrane 80 and leaving the concentrate behind. The permeate exits the second end 84 of the membrane 80, flows through the permeate opening 212, the permeate passage 214, and finally out of the suction end cap 200 into the permeate fitting 404. The O-rings 190 prevent permeate from leaking out of the second tube 150 during the reverse osmosis process. Once permeate enters the permeate fitting 404, the check valve 42 allows the permeate to flow through the permeate conduit 40 and into the storage tank 46.

The second recess 210 also includes a drain opening 216 that places the second recess in fluid communication with a drain passage 218 that extends away from the second recess and through a peripheral side of the suction end cap 200. In other words, the drain passage 218 may have a substantially L-shaped pathway through the suction end cap 200. The drain opening 216 and the cram passage 218 may be circular in shape or may have an alternative shape such as triangular, rectangular, square, etc. The feed passage 206, the permeate passage 214, and the drain passage 218 may all extend to and through the same peripheral wall of the suction end cap 200. Alternatively, one or more of the feed passage 206, the permeate passage 214, and the drain passage 218 may extend to and through different peripheral walls of the suction end cap 200 from one another.

The drain passage 218 receives the drain fitting 410 connected to the drain conduit 60 and the drain opening 216 receives the flow regulating disc 412 to regulate the flow of concentrate out of the drain passage and thereby create the back pressure required to perform reverse osmosis. Accordingly, during the reverse osmosis process in the second tube 150, concentrate from the feed water is maintained in the gap between the membrane 80 and the second tube. The concentrate then flows through the drain opening 216 and the drain passage 218. Since the flow regulating disc 412 is positioned in the drain opening 216, fluid flow through the drain passage is restricted. In other words, the flow regulating disc 412 provides a restricted orifice relative to the drain passage 218 such that back pressure is created. It is the back pressure in the drain passage 218 that helps to facilitate the reverse osmosis process within the second tube 150. The concentrate flows through the flow regulating disc 412 and into the drain fining 410. The concentrate can then be directed via the drain conduit 60 to a drain or fed to another membrane as described above to cascade the reverse osmosis process.

The second recess 210 may further include an opening 220 that places the second recess in fluid communication with a recycling passage 222 that extends away from the second recess and into fluid communication with the blind passage 205 and the first recess 202. The opening 220 thereby places the second recess 210 into fluid communication with the first recess 20 and, thus, into fluid communication with the first tube 100.

In operation, some of the concentrate that otherwise would be expelled from the second tube 150 to the drain conduit 60 via the drain opening 216 and the drain passage 218 instead flows through the opening 220 and into the recycling passage 222 to be passed through the blind passage 205 and the first recess 202. The concentrate is therefore recycled back to the first tube 100 in fluid communication with the first recess 202 and thus, back to the pump 70. The recycled concentrate is then pumped back through the membrane 80 in order to further separate permeate from the concentrate. A flow regulating disc 406 (see FIG. 4) is secured within the opening 220 via an E-clip 408. The flow regulating disc 406 regulates the flow of concentrate through the recycling passage 222 and thereby helps to generate the back pressure required to perform reverse osmosis in the membrane 80.

Figure 6A:
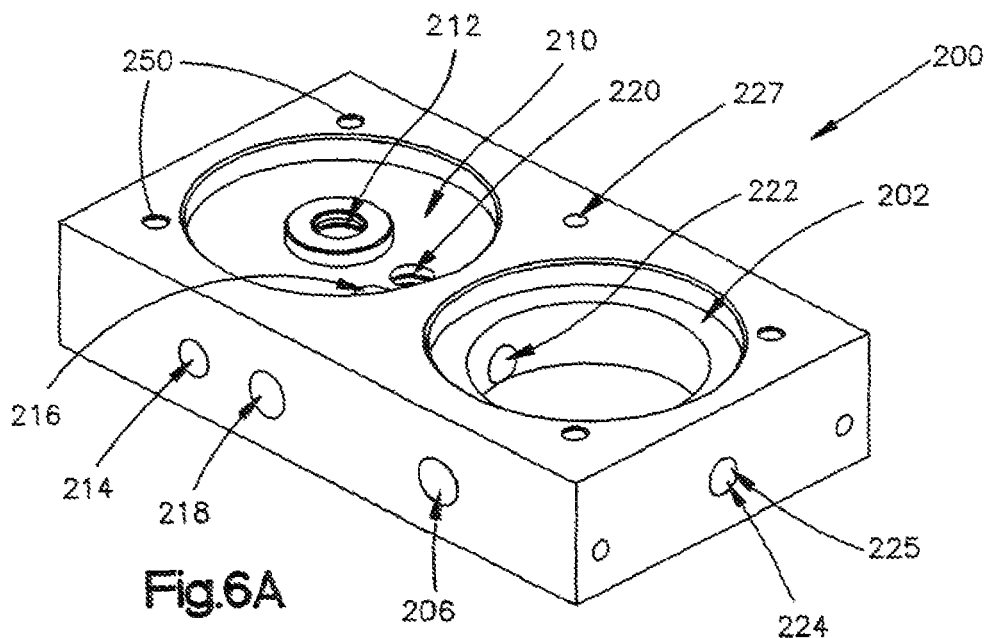
FIG. 6A is a perspective view of a bottom plate of the reverse osmosis unit of FIG. 2.
Figure 6B:
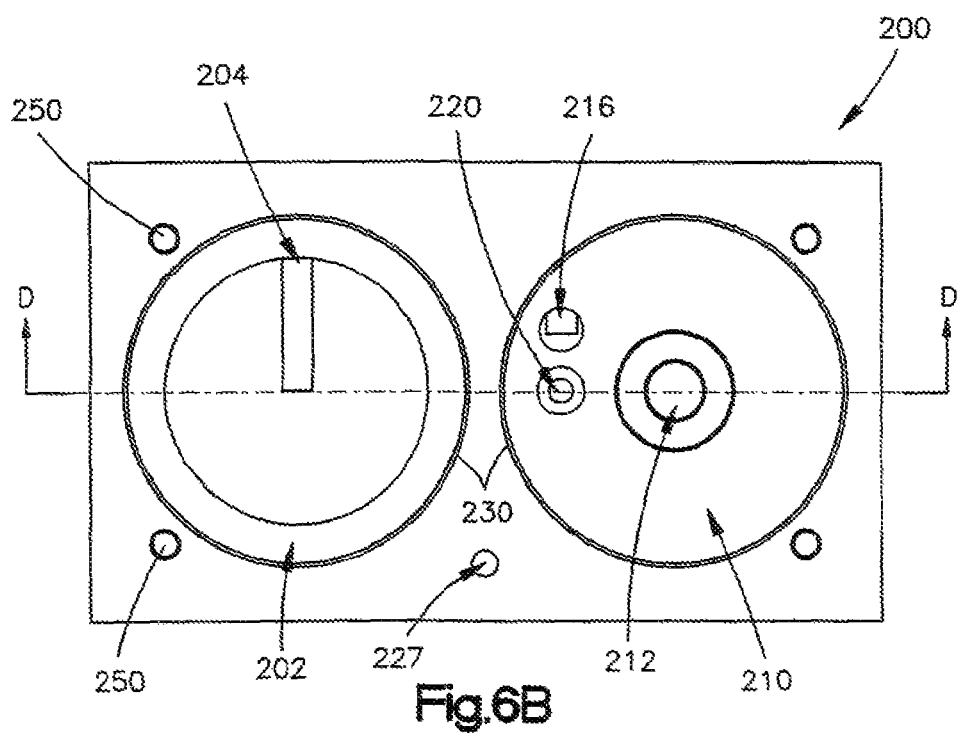
FIG. 6B is a top view of the bottom plate of FIG. 6A.
Figure 7C:
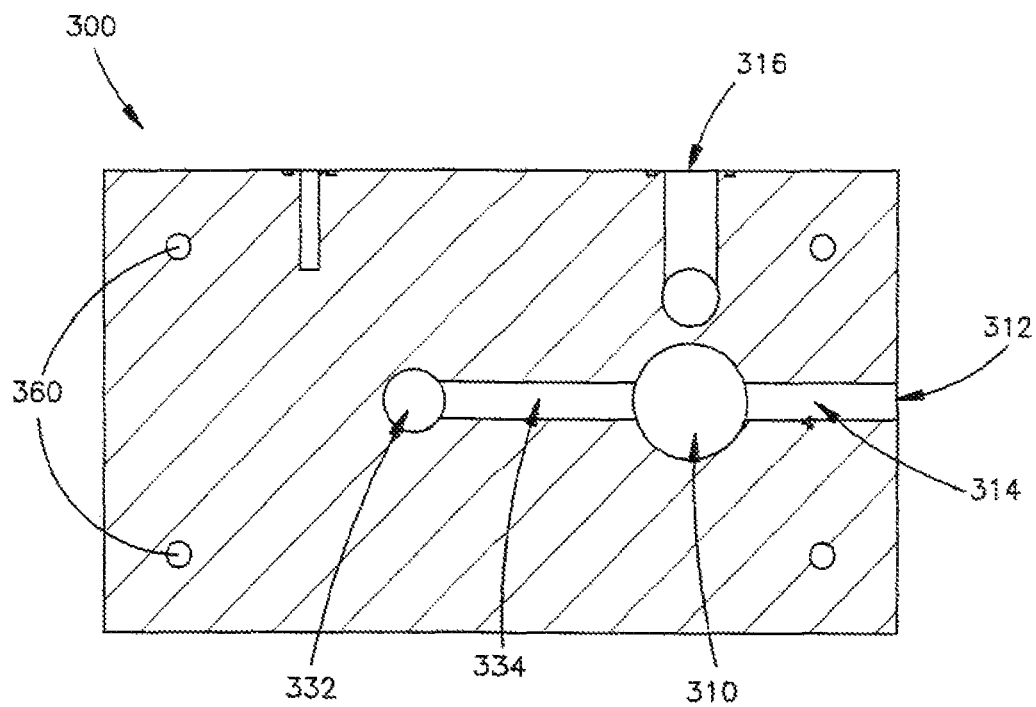
FIG. 7C is a section view of the top plate of FIG. 7A.
Figure 7D:
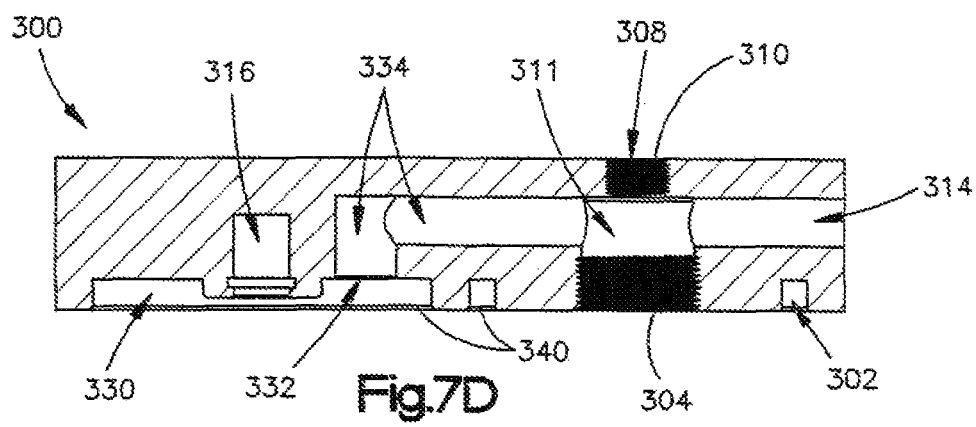
FIG. 7D is a section view of the top plate of the reverse osmosis unit of FIG. 7A taken along, line D-D.

As shown in FIGS. 6B-D, since the recycling passage 222 is in fluid communication with the blind passage 205, the recycling passage is also in communication with the feed passage 204. A pressure monitoring passage 226 formed in the suction end cap 200 is in fluid communication with the recycling passage 222 and extends toward the peripheral wall of the suction end cap 200. A plug (not shown) seals the pressure monitoring passage 226 at the peripheral wall of the suction end cap 200.

A pressure monitoring opening 227 formed in the top of the suction end cap 200 with the first and second recesses 100 and 105 is in fluid communication with the pressure monitoring passage 226. A pressure switch 400 (see FIG. 4) is mounted in the pressure monitoring opening 221 and monitors the pressure of the pressure monitoring passage 226 and, thus, the feed passage 204. In particular, the pressure switch 400 monitors the pressure of the feed water entering first tube 100 from the feed conduit 32. If the pressure falls below a predetermined amount, the pressure switch 400 communicates with the controller 90 in order to close the inlet valve 34 and deactivate the pump 70 in order to shut down the R/O unit 30.

The opening 220 in the suction end cap 200 is also in fluid communication with a auxiliary passage 224 that extends away from the blind passage 205 and to an auxiliary opening 225 in a peripheral side of the suction end cap. The auxiliary passage 224 and the auxiliary opening 225 are in fluid communication with the recycling passage 222. The auxiliary passage 224 and the auxiliary opening 225 may be circular in shape or may have an alternative shape such as triangular, rectangular, square, etc. The auxiliary opening 225 receives a plug (not shown) to seal the auxiliary opening and the auxiliary passage 224.

FIGS. 7A-D illustrate the pressure end cap 300 in accordance with the present invention. As with the suction end cap 200, the pressure end cap 300 provides an efficient means to route and distribute fluid through the R/O unit 30 and, in particular, between the pump 70 and the membrane 80 while minimizing plumbing connections and, thus, the propensity for leakage.

As noted, the suction end cap 200 and the pressure end cap 300 cooperate to retain the membrane 80 within the second tube 150. Although the pressure end cap 300 is illustrated as being constructed of a single piece, those having ordinary skill in the art will appreciate that the pressure end cap could be configured such that a portion 301 (see FIG. 3) is removable in order to access the interior of the second tube 150. The removable portion 301 of the pressure end cap 300 is received in an opening 303 in the pressure end cap and is held against the membrane 80 and within the end cap by a retaining ring 305 that fits within an annular grove 307 in the end cap. By providing access to the interior of the second tube 150, the membrane 80 within the second tube can quickly and easily be removed and replaced. Although FIG. 3 illustrates that the pressure end cap 300 includes the removable portion 301 those having ordinary skill will contemplate that the suction end cap 200 may alternatively or additionally include a removable portion for accessing the membrane 80 without removing the suction end cap.

The pressure end cap 300 has a generally rectangular shape and is constructed of any substantially rigid material such as metal, plastic or combinations thereof. The pressure end cap 300 includes a first recess 302 and a second recess 330 positioned on the same side of the suction end cap 200. The first recess 302 is ring-shaped and configured to receive the first end 122 of the first tube 100. The second recess 330 is circular in shape or otherwise configured to receive the first end 152 of the second tube 150. A chamfer 340 extends around, and is co-axial with, each of the first and second recesses 302 and 330. The chamfer 340 around the first recess 302 guides the first end 122 of the first tube 100 and the O-ring 180 into the first recess to provide the sealed connection between the first recess and the first end of the first tube 100. The chamfer 340 around the second recess 330 guides the first end 152 of the second tube 150 and the O-ring 190 into the second recess to provide the sealed connection between the second recess and the first end of the second tube.

The pressure end cap 300 further includes a pump connection hole 304. The pump connection hole 304 is configured to receive a threaded portion (not shown) of the pump 70 and constitutes a threaded bore positioned inward of the ring-shaped first recess 302 and. The pump connection hole 304 is in fluid communication with a blind passage 311 that extends away from the pump connection hole and through the interior of the pressure end cap 300.

The second recess 330 includes a connection opening 332 that places the second recess in fluid communication with a connection passage 334 that extends away from the second recess and into fluid communication with the blind passage 311. In other words, the connection passage 334 may have a substantially L-shaped pathway through the pressure end can 300. The connection opening 332 and the connection passage 334 may be circular in shape or may have an alternative shape such as triangular, rectangular, square, etc.

The second recess 330 also includes a membrane connection hole 336 that is configured to receive the first end 82 of the membrane 80. In particular, the membrane connection hole 336 may constitute a blind bore that may be circular in shape or may have an alternative shape such as triangular, rectangular, square, etc.

Since the connection passage 334 is in fluid communication with the blind passage 311, the connection passage and, thus, the connection opening 332 is in fluid communication with the pump connection hole 304. Accordingly, the first tube 100 is in fluid communication with the second tube 150 through the pressure end cap 300. Due to this configuration the feed water within the first tube 100 is pumped by the pump 70 and exits the pump and the first tube through the pump connection hole 304. The pumped feed water then flows through the blind passage 311, the connection passage 334, through the connection opening 332, and into the gap between the second tube 150 and the membrane 80. The feed water submerses the membrane 80 in the second tube 150 and subsequently undergoes reverse osmosis as described.

Due to the close proximity between the first tube 100 and the second tube 150, any heat generated by the motor 170 is imparted to the feed water as it flows from the first tube, through the pressure end cap 300, and to the membrane 80 within the second tube. Heating the feed water increases the rate of permeate production. In other words, since the pressure end cap 300 internally routes the feed water from the first tube 100 to the second tube 150, there are no external plumbing connections required to supply the feed water from the pump 70 to the membrane 80. The lack of plumbing connections ensures that the first tube 100 and the second tube 150 are in close proximity to one another and, thus, the feed water surrounding the motor 170 remains heated by the time the feed water reaches the membrane 80. The lack of plumbing connections in the R/O unit 30 also reduces the likelihood of leakage.

The pressure end cap 300 further includes a temperature monitoring hole 308 located on a side of the pressure end cap opposite the first recess 302 and the second recess 330. The temperature monitoring hole 308 may constitute a threaded bore and is in fluid communication with the blind passage 311 and, thus, the pump connection passage 334. The temperature monitoring hole 308 receives the temperature switch 450 (see FIG. 3) for monitoring the temperature of the feed water flowing between the pump 70 in the first tube 100 and the membrane 80 in the second tube 150.

A permeate rinse opening 312 is located on the periphery of the pressure end cap 300 and is in fluid communication with a permeate rinse passage 314. The permeate rinse passage 314 extends substantially perpendicular to the blind passage 311 and is in fluid communication with the blind passage and, thus, the connection passage 334. The permeate rinse opening 312 receives a fitting 57, such as a tee shaped fitting. The fitting 57 is connected to the pressure gauze 452 (see FIG. 3) for monitoring the pressure of the feed water flowing between the pump 70 in the first tube 100 and the membrane 80 in the second tube 150. The controller 90 communicates with the temperature switch 450 and the pressure switch 400 and ma shut down the R/O unit 30 if the temperature and/or the pressure reaches undesirable, i.e., high or low, levels.

The fitting 57 is also connected to the permeate rinse valve 56, the rinse conduit 54 (see FIG. 1), and the check valve 58 (not shown). Since the rinse conduit 54 is in fluid communication with the fitting 57 and, thus, the rinse opening 312, the rinse conduit is also in fluid communication with the connection passage 334 extending to the connection opening 332. In operation, once the R/O unit 30 has been shut down, the rinse valve 56 is opened to allow the rinse permeate supplied by the storage tank 46 to flow through the rinse valve and into the rinse opening 312 in the pressure end cap 300. The rinse permeate then flows through the rinse passage 314, the blind passage 311, the connection passage 334, and out through the connection opening 332 into the second tube 150 in order to flush the membrane 80. Flushing the membrane 80 removes built up particulate and debris on the concentrate side of the membrane, thereby lengthening the useful life of the membrane. A check valve (not shown) integral with the pump 70 prevents the permeate rinse from flowing backwards through the pump during flushing of the membrane 80. When flushing of the membrane 80 is complete, the controller 90 closes the permeate rinse valve 56 to shut of the supply of rinse permeate from the storage tank 46. If desired, the inlet valve 34 can be opened again and the pump 70 activated to reinitiate the reverse osmosis process.

A control box receiving hole 316 is located on the periphery of the pressure end cap 300 and is in fluid communication with a control box receiving passage 318. A portion of the control box receiving passage 318 extends substantially perpendicular to the pressure monitoring passage 314 and another portion of the control box receiving passage extends substantially parallel to the blind passage 311. In other words, the control box receiving passage 318 may have a substantially L-shaped pathway through the pressure end cap 300. The control box receiving hole 316 receives the controller 90 to mount the controller to the pressure end cap 300.

As noted, the second wiring harness 428 (see FIG. 3) connects the pump motor 170 to the controller 90. In particular, the second wiring harness 428 extends from the motor 170 and within the first tube 100 to the control box receiving passage 318. A pass through section (not shown) on the second wiring harness 428 seals to the wires and to the passage 318 to prevent feed water from getting into the controller 90. The second wiring harness 428 then extends through the control box receiving hole 316 and into the controller 90.

The temperature monitoring hole 308, the blind passage 311, the pressure monitoring opening 312, the pressure monitoring passage 314, the control box hole 316, the control box passage 318, the connection opening 332, and the connection passage 334 may be circular in shape or may have an alternative shape such as triangular, rectangular, square, etc.

Figure 8:
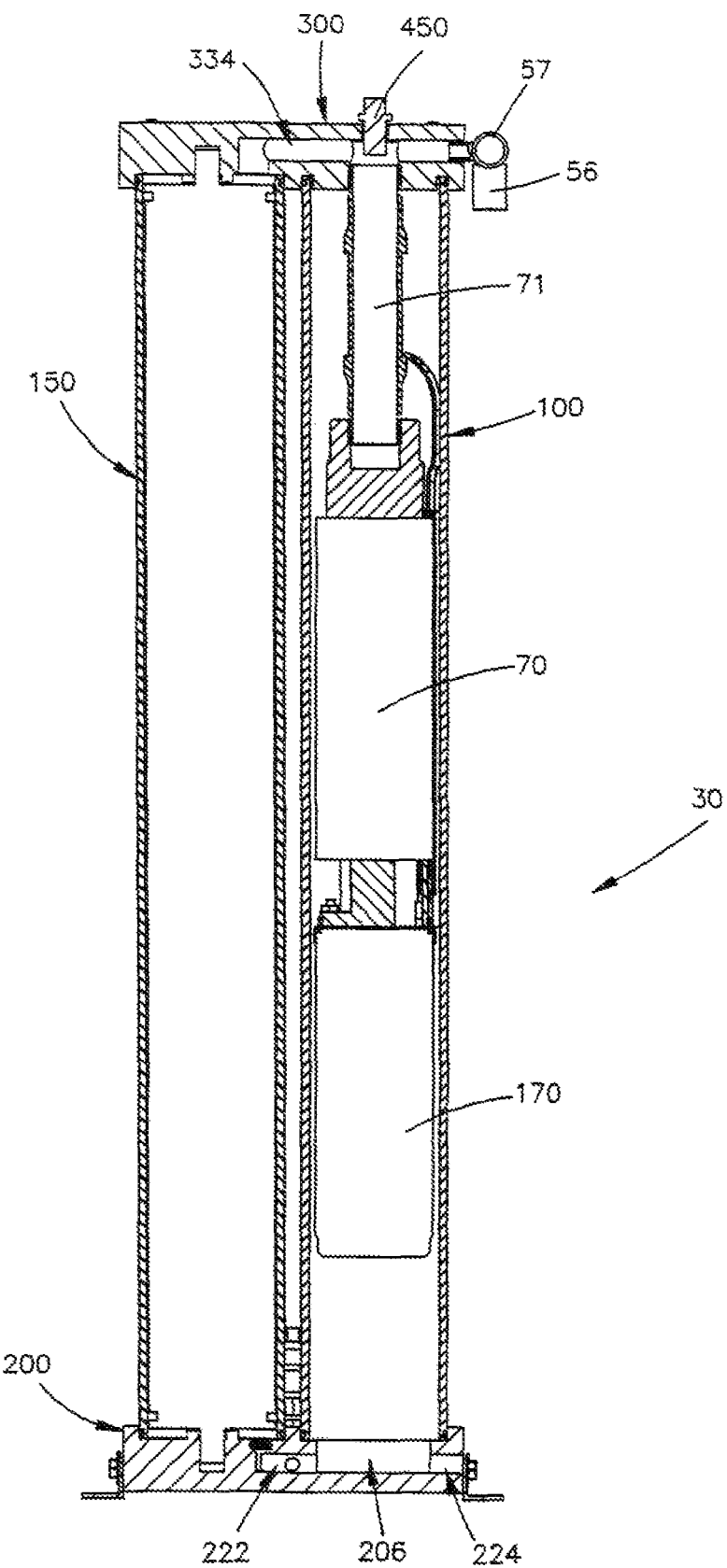
FIG. 8 is a front sectional view of FIG. 2.
Figure 10:
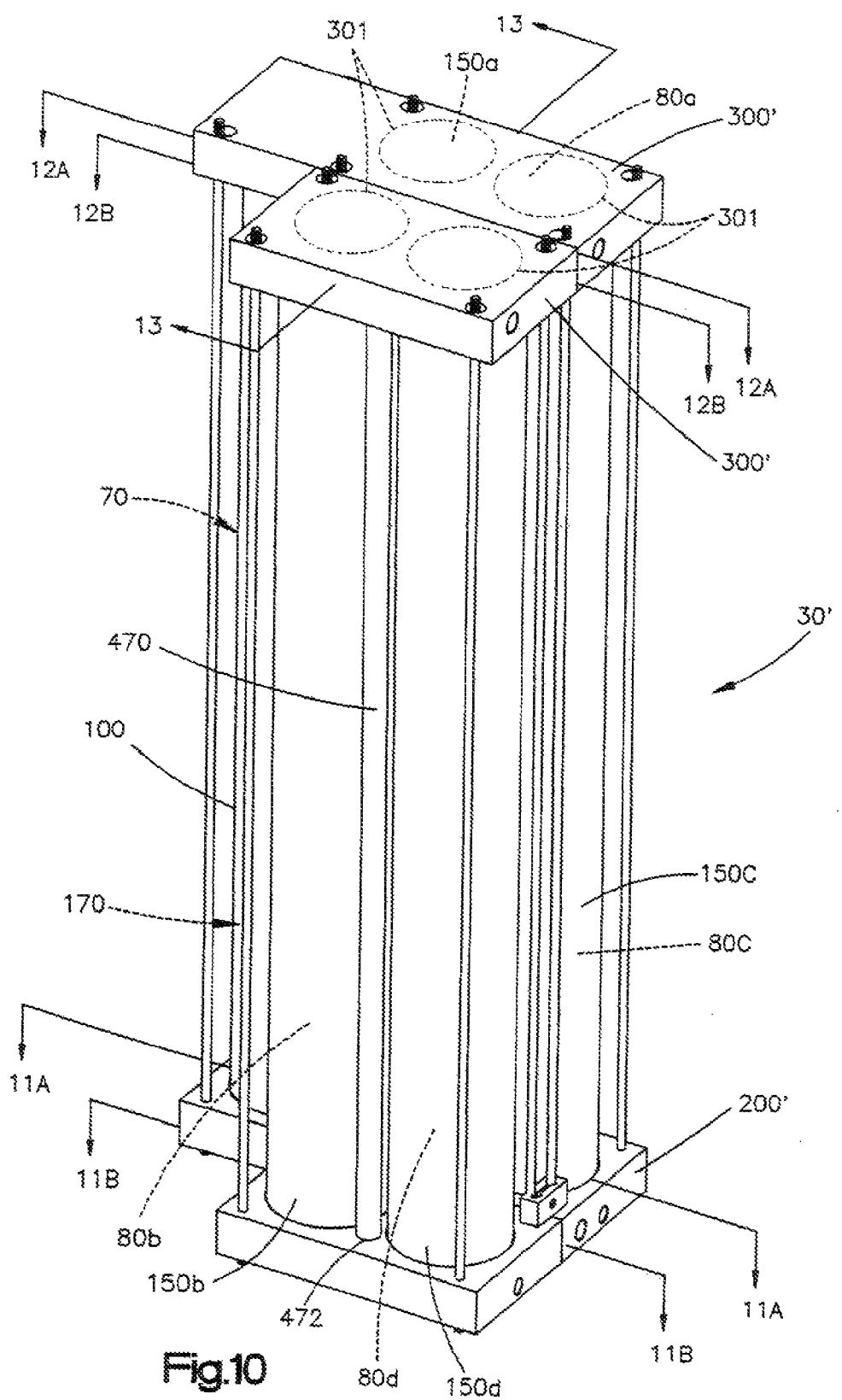
FIG. 10 is a perspective view of a reverse osmosis unit of the fluid treatment system of FIG. 9C.
Figure 12A:
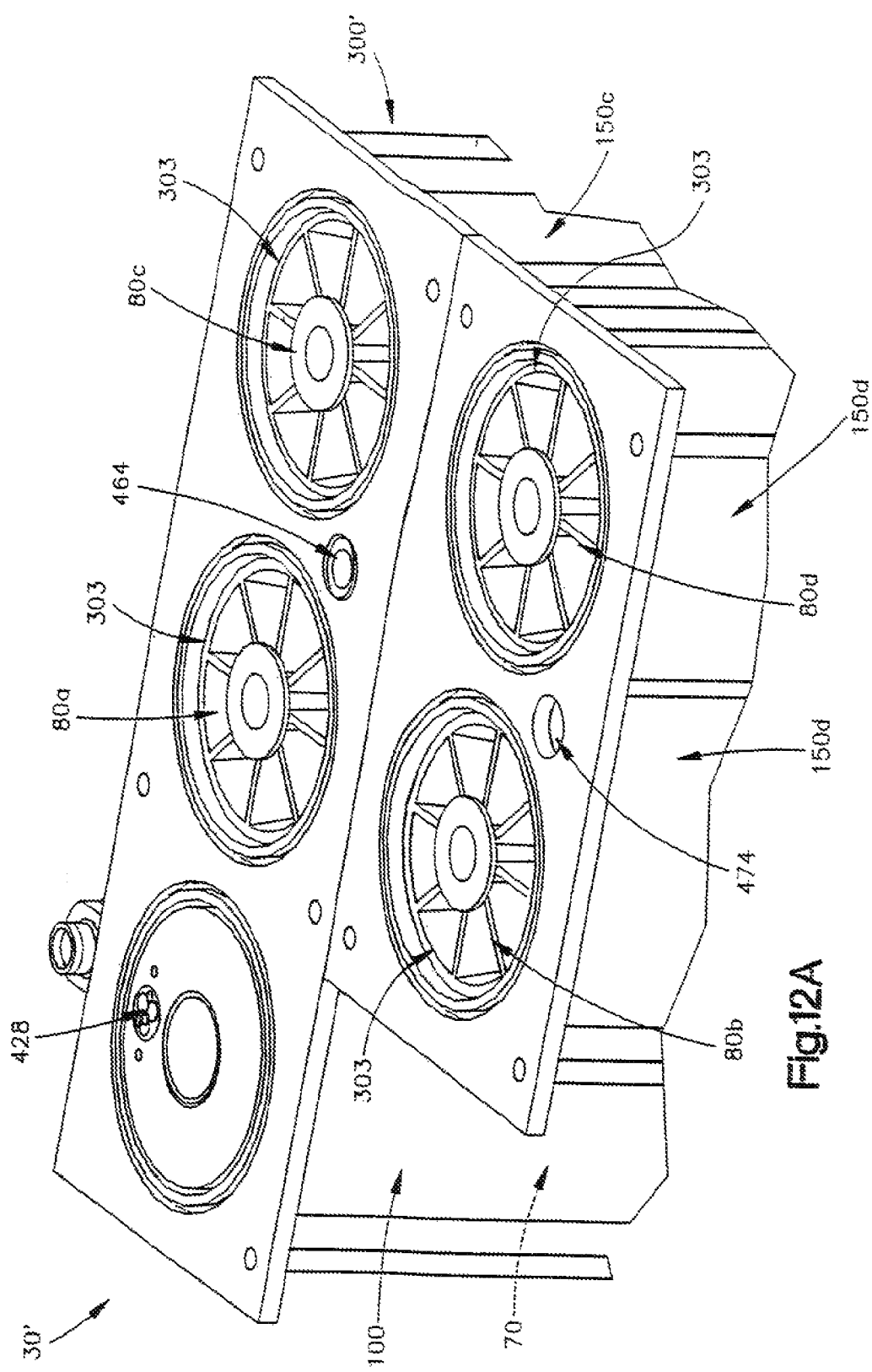
FIG. 12A is a section view of the reverse osmosis unit of FIG. 10 taken along line 12A-12A.

It is clear from the above that the suction end cap 200 and the pressure end cap 300 eliminate a multitude of external plumbing connections (see FIG. 8) that are present in conventional fluid treatment systems. For example, the suction end cap 200 and the pressure end cap 300 internally provide all the necessary fluid connections between the R/O unit 30 and the input/output fluid lines, e.g., the feed conduit 32, the permeate conduit 40, the permeate rinse conduit 54, the concentrate conduit 43, and the drain conduit 60. The connection opening 332 and the connection passage 334 in the pressure end cap 300 that provide fluid communication between the pump 70 and the membrane 80 also eliminate conventional plumbing connections; as does the integral recycling passage 222 in the suction end cap 200 and the permeate rinse passage 314 in the pressure end cap 300. By reducing the amount of plumbing connections, the present invention reduces both cost and the likelihood for leaks within the fluid treatment system 20. The present invention also reduces the overall size of the fluid treatment system 20, thereby saving floor space.

In accordance with another embodiment of the present invention, the fluid treatment system and in particular the R/O unit may include more than one membrane for separating permeate and concentrate from feed water in a cascading manner. Such fluid treatment systems may operate with a single pump or multiple pumps. FIGS. 9A-9C illustrate several configurations for such a cascading fluid treatment system. Features in FIGS. 9A-9C that are substantially identical to features in FIGS. 1-8 are referred to by the same reference number and similar features are given the suffix. Where the same feature is provided multiple times, each instance of that feature is given the suffix "a, b, c," etc.

FIG. 9A illustrates a fluid treatment system in which the feed conduit 32 supplies feed water to a first membrane 80a and a second membrane 80b configured in series with one another. In other words, the concentrate exiting the first membrane 80a through the drain opening 216 becomes the feed liquid for the second membrane 80b. The concentrate exiting the second membrane 80b is in fluid communication with the drain conduit 60 and the recycling passage 222 for recycling concentrate back through the first membrane 80a. Permeate from the first membrane 80a and the second membrane 80b flows through the permeate opening 212 and the permeate passage 214 into the permeate conduit 40 leading to the storage tank 46 (not shown). The serial connection between the first membrane 80a and the second membrane 80b allows the concentrate exiting the first membrane that otherwise would be discarded to be further purified by the second membrane in order to salvage or generate more permeate.

FIG. 9B illustrates an alternative fluid treatment system in which the feed conduit 32 supplies feed water to a first membrane 80a and a second membrane 80b configured in parallel with one another. In other words, the feed conduit 32 supplies feed water to both the first membrane 80a and the second membrane 80b at substantially the same time. Permeate from the first membrane 80a and the second membrane 80b flows through the permeate openings 212a and 212b, respectively and into the permeate conduit 40 leading to the storage tank 46.

The concentrate from the first membrane 80a and the concentrate from the second membrane 80b exit the respective drain openings 216a and 216b and combine to act as the feed liquid to a third membrane 80b. The third membrane 80c is therefore configured in series with the first and second membranes 80a and 80b. The concentrate exiting the third membrane 80c is in fluid communication with the drain conduit 60 and the recycling passage 222 for recycling concentrate back through the first membrane 80a and/or the second membrane 80b. Permeate from the third membrane 80c flows through the permeate opening 212c and into the permeate conduit 40 leading to the storage tank 46.

FIG. 9C illustrates an alternative fluid treatment system in which the feed conduit 32 supplies feed water to a first membrane 80a and a second membrane 80b configured in parallel with one another. In other words, the feed conduit supplies feed water to both the first membrane 80a and the second membrane 80b at substantially the same time. Permeate from the first membrane 80a and the second membrane 80b flows through the permeate openings 212a and 212b, respectively, and into the permeate conduit 40 leading to the storage tank 46.

The concentrate from the first membrane 80a exits the drain opening 216a and acts as the feed liquid to a third membrane 80c. The third membrane 80c is therefore configured in series with the first membranes 80a. The concentrate from the second membrane 80b exits the drain opening 216b and acts as the feed liquid to a fourth membrane 80d. The fourth membrane 805 is therefore configured in series with the second membrane 80b.

The concentrate exiting the third membrane 80c is in fluid communication with the drain conduit 60 and the recycling passage 222 for recycling concentrate back through the first membrane 80a and/or the second membrane 80b. Permeate from the third membrane 80c flows through the permeate opening 212c and into the permeate conduit 40 leading to the storage tank 46.

The concentrate exiting the fourth membrane 80d is in fluid communication with the drain conduit 60 and the recycling passage 222 for recycling concentrate back through at least one of the first membrane 80a, the second membrane 80b, and the third membrane 80c. Permeate from the fourth membrane 80d flows through the permeate opening 212d and into the permeate conduit 40 leading to the storage tank 46.

Although the fluid treatment systems illustrated in FIGS. 9A-9C are illustrative of the configuration of the respective membranes only, those having ordinary skill in the art will appreciate that the fluid treatment systems in FIG. 9A-9C may have more than one recycling passage 222 and may include one or more permeate rinse passages 314 in order to flush one or more membranes. Furthermore, those skilled in the art will appreciate that any number of membranes 80 can be configured in any number of parallel and/or serial connections in accordance with the present invention. Accordingly, the suction end cap 200 and pressure end cap 300 may also be configured to accommodate any number of membranes 80 in order to provide the same compact, efficient fluid treatment system having minimal plumbing connections in accordance with the present invention.

FIGS. 10-13 illustrate an R/O unit 30 that has the four membrane 80a-d configuration shown in FIG. 9C. The R/O unit 30' includes a pump 70 and a motor 170 retained within a first tube 100. Each of four membranes 80a-d is retained in a second tube 150. The first and second tubes 100 and 150 are closed at their ends by a suction end cap 200' and a pressure end cap 300'. Although the suction end cap 200' and the pressure end cap 300' each appear to be made from separate pieces connected together, the suction end cap and/or the pressure end cap may each be made as a single, unitary piece. The pressure end cap 300' may be provided with a removable portion, illustrated by phantom 301, corresponding with each membrane 80a-d in order to access and remove each membrane from each second tube 150a-d without completely removing the pressure end cap. A controller not shown) controls operation of the R/O unit 30'. The R/O unit 30' may also include some or all of the fittings, sensors, gauges, etc. that the R/O unit 30 includes.

In operation, the controller opens the inlet valve 34 to allow feed water to enter the R/O unit 30' through the inlet conduit 32. As with the R/O unit 30, the feed water may be supplied to the R/O unit 30' under pressure at about 50-70 psi. The pump 70 forces the feed water through the connecting passage 334a and the connecting passage 334b in the pressure end cap 300' in order to supply feed water to both the first membrane 80a and the second membrane 80b in parallel. Permeate from the first membrane 80a and the second membrane 80b flows through the permeate openings 212a and 212b, respectively, out of the suction end cap 200, and into the permeate conduit 40 leading to the storage tank 46. In particular, permeate from the first membrane 80a flows through the permeate opening 212a, into the permeate passage 214a, and into the permeate conduit 40 leading to the storage tank 46. Permeate from the second membrane 80b flows through the permeate opening 212b, into the permeate passage 214b, into the permeate passage 214d, through a permeate transfer element (illustrated schematically by arrow 490 in FIGS. 11A-B), into the permeate passage 214c, and into the permeate conduit 40 leading to the storage tank 46. The permeate transfer element 490 ma a tube or pipe or any structure capable of directing permeate flow from the permeate passage 214d to the permeate passage 214c.

Concentrate from the first membrane 80a exits the drain opening 216a and acts as the feed liquid to the third membrane 80c. In particular, concentrate from the first membrane 80a flows through the drain opening 216a, the drain passage 218a connecting the first membrane 80a to the third membrane 80c, and into an inlet end 462 of a first transfer pipe 460 that extends upwards to the pressure end cap 300' (see FIG. 13). The first transfer pipe 460 terminates at an outlet end 464 within a transfer passage 480c in the pressure end cap 300', which is in fluid communication with the third membrane 80c via the connection passage 334c. The third membrane 80c is therefore configured in series with the first membranes 80a.

Figure 13:
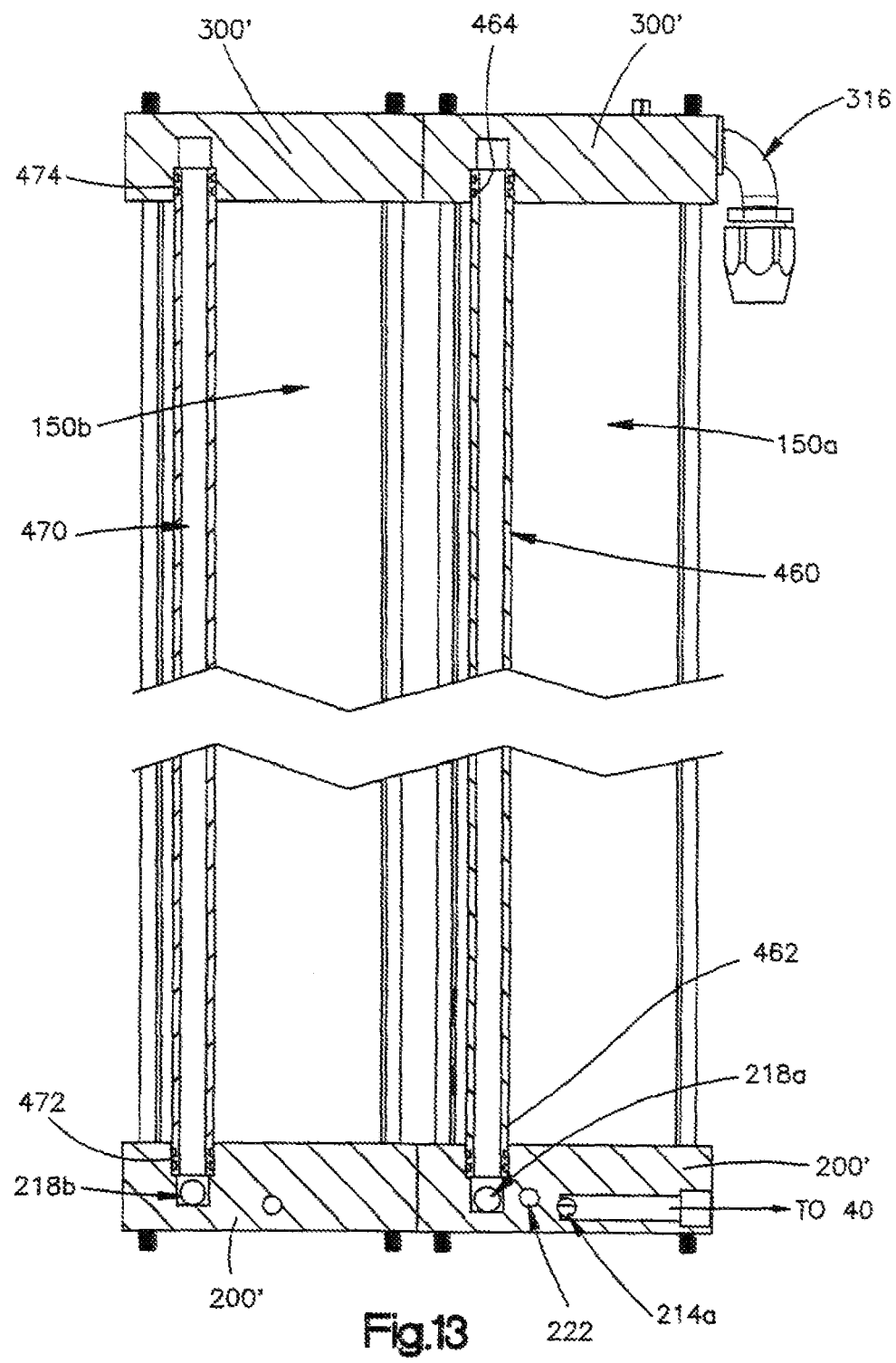
FIG. 13 is a section view of the reverse osmosis unit of FIG. 10 taken along line 13-13.

Likewise, concentrate from the second membrane 80b flows through the drain opening 216b, the drain passage 218b, and into an inlet end 472 of a second transfer pipe 470 that extends upwards to the pressure end cap 300' (see FIG. 13). The second transfer pipe 470 terminates at an outlet end 474 within a transfer passage 480d in the pressure end cap 300', which is in fluid communication with the fourth membrane 80d via the connection passage 334d. The second membrane 80b is therefore configured in series with the fourth membranes 80d.

Both of the transfer passages 480c, 480d extend through the periphery of the pressure end cap 300'. Although the transfer passages 480c, 480d are illustrated as being plugged with plugs 486, those having ordinary skill will contemplate that one or more of the plugs may be omitted such that concentrate may pass from the transfer passage(s) to for example, additional membranes. Likewise, the drain passages 218a, 218b extend through the periphery of the suction end cap 200' and are plugged with plugs 486, although one or more of the plugs may be omitted to allow concentrate to pass from the drain passage(s) to, for example, additional membranes.

Concentrate exiting the third membrane 80c is in fluid communication with the drain conduit 60 via the drain opening 216c and the drain passage 218c. Concentrate exiting the third membrane 80c is also in fluid communication with the recycling passage 222 via the opening 220c for recycling concentrate back to and through the first membrane 80a. Permeate from the third membrane 80c flows through the permeate opening 212c and the permeate passage 214c to the permeate conduit 40 leading to the storage tank 46.

Concentrate exiting the fourth membrane 80d is in fluid communication with the drain conduit 60. Concentrate from the fourth membrane 80d may flow through the drain opening 216d, the drain passage 218d, and into a connection passage, illustrated by phantom lines 217 in FIG. 11B, that is in fluid communication with the opening 220c via a connection opening 219. Concentrate from the fourth membrane 80d and, thus, the second membrane 80b may therefore flow to the drain conduit 60 via the drain opening 216c and/or through the recycling passage 222 via the opening 220c. Permeate from the fourth membrane 80d flows through the permeate opening 212d, to the permeate passage 214d, and into the permeate conduit 40 leading to the storage tank 46.

From the above configuration, it is clear that a single recycle passage 222, a single permeate conduit 40, and a single drain conduit 60 in the suction end cap control fluid processing of all the membranes 80a-d in a simple, compact, and efficient manner. This is advantageous for the reasons discussed.

Figure 14:
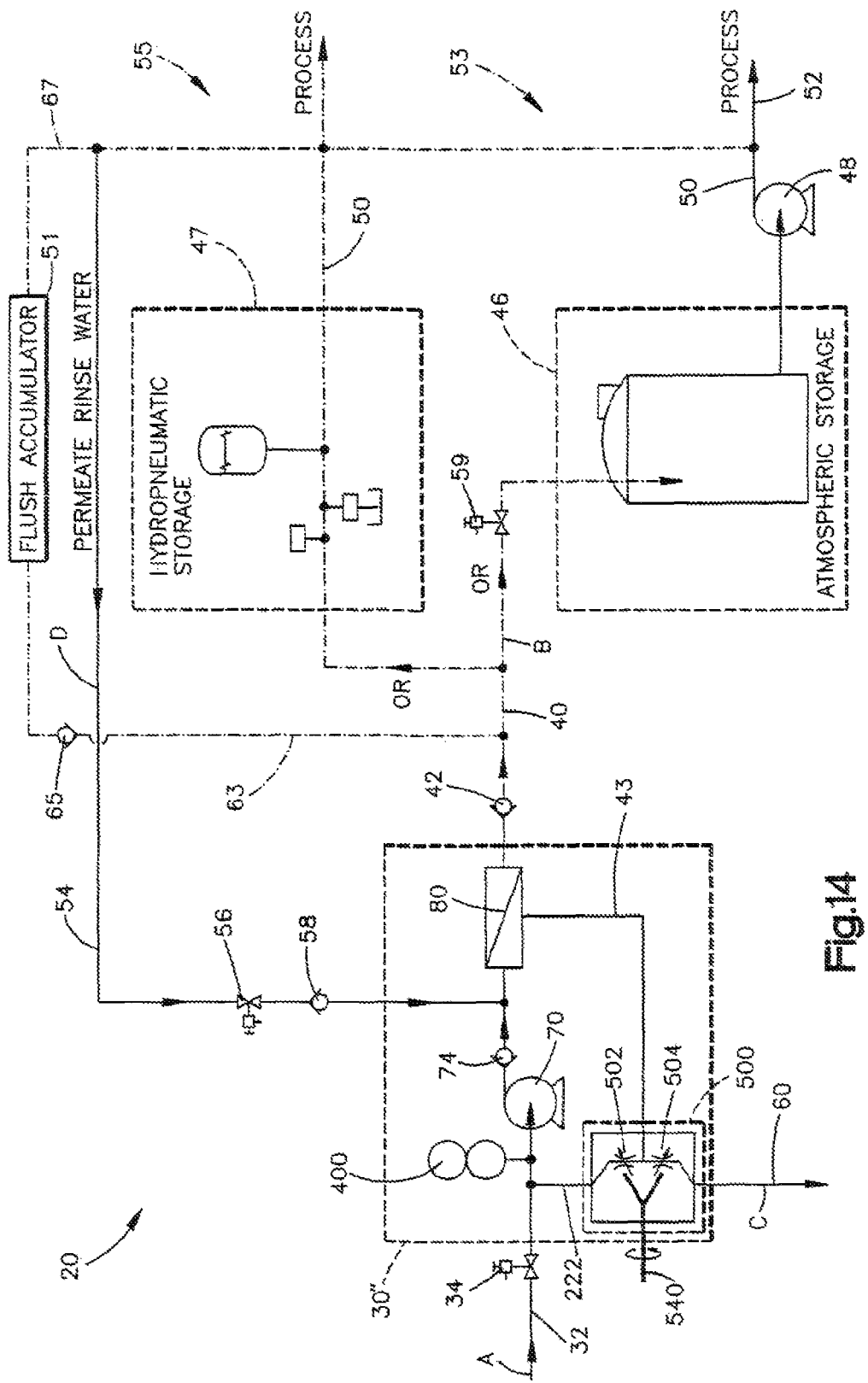
FIG. 14 is a schematic illustration of a fluid treatment system in accordance with another aspect of the present invention.

FIG. 14 illustrates an R/O unit 30" in accordance with another aspect of the present invention. Features in FIG. 14 that are substantially identical to features in FIGS. 1-8 are referred to by the same reference number. The R/O unit 30" in FIG. 14 includes an adjustable flow control element 500 for regulating the flow rate and pressure within the R/O unit. More specifically, the flow control element 500 regulates the flow rate and pressure of concentrate passing through the recycling passage 222 to be recycled by the membrane 80A as well as concentrate passing through the drain passage 218 to be drained out of the R/O unit 30" via the drain conduit 60. The flow control element 500 may be positioned within or integral with the suction end cap 200 or may be positioned outside of the suction end cap.

As noted, concentrate residue leftover from the permeate passing through the membrane 80A passes through the opening 220 in the suction end cap 200 as a single stream before it is divided between concentrate re-circulated back through the membrane or waste sent to drain. The flow control element 500 receives the single stream from the opening 220 and divides it evenly or unevenly into two streams, namely, a stream passing to the recycling passage 222 and a stream passing to the drain passage 218.

Integral with the flow control element 500 are, two fluid resistance elements such as first and second orifices 502, 504 that provide resistance to each of the streams heading to the recycling passage 222 and the drain passage 218. Each of the orifices 502, 504 is adjustable to vary the resistance to flow of the respective concentrate stream to the recycling passage 222 and the drain passage 218. The orifices 502, 504 may be separately or simultaneously adjusted. The resistance value for one orifice 502 or 504 may be the same as or different from the resistance value for the other orifice 502 or 504 at any given time. The combined resistance value of the two orifices 502, 504 may be constant over the adjustment range. The constant total fluid resistance serves to maintain a constant flow rate from the pump 70.

Figure 15:
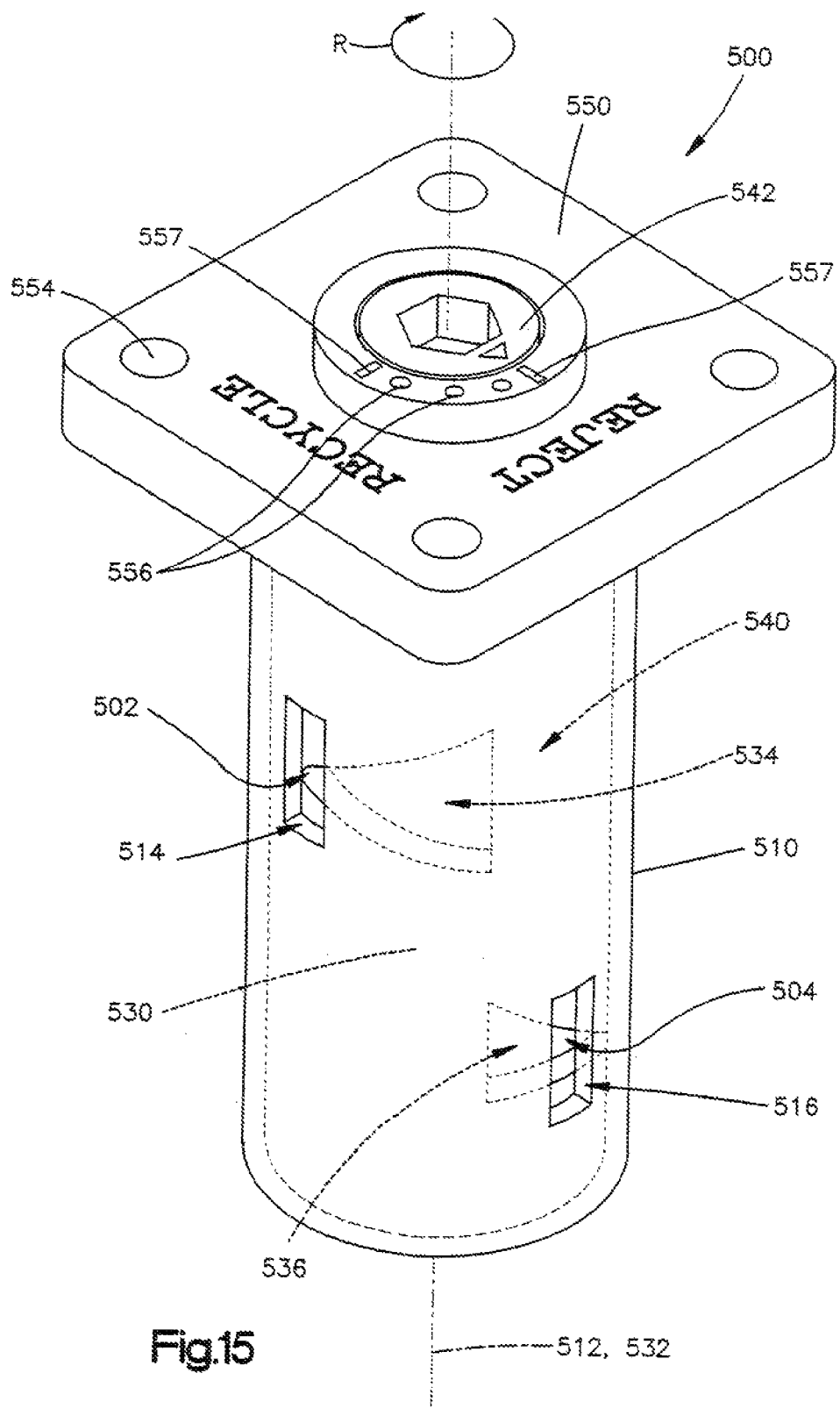
FIG. 15 is schematic illustration of an adjustable flow control element for the fluid treatment system of FIG. 14.

In one aspect of the present invention the adjustable flow control element may comprise a continuously variable flow control element 500 as shown in FIG. 15. The flow control element 500 may have a rotary motion adjustment configuration and includes an outer sleeve 510, an inner sleeve 530 positioned within the outer sleeve, and a flange 550 that connects the inner sleeve to the outer sleeve. The outer sleeve 510 may have a cylindrical or conical shape and extends along, a longitudinal axis 512. The inner sleeve 530 may have a cylindrical or conical shape and extends along a longitudinal axis 532 aligned with the axis 512 of the outer sleeve 510. The outer sleeve 510 and inner sleeve 530 may have any shape so long as the outer sleeve and inner sleeve have the same shape. The outer sleeve 510 and inner sleeve 530 mate sealingly with one another (not shown) to ensure that no fluid passes in between the inner and outer sleeves. For example, the inner sleeve 530 may have a flexible zone that when energized from the incoming fluid pressure serves to enhance the sealing engagement between the inner sleeve and the outer sleeve 510 around the orifices 502, 504.

As shown in FIGS. 16A-16B, the outer sleeve 510 includes a first opening 514 and a second opening 516 that extend entirely through the outer sleeve. The first and second openings 514, 516 are located around the periphery of the outer sleeve 510. The first and second openings 514, 516 may be axially aligned with one another or may be offset. The first opening 514 is configured to direct fluid to the recycling passage 222 of the suction end cap 200 and the second opening 516 is configured to direct fluid to the drain passage 218 of the suction end cap. The first and second openings 514, 516 each have a rectangular shape but may alternatively have any shape such as circular, square, triangular, etc.

An inlet opening 518 extends through the outer sleeve 510 and is in fluid communication with the opening 220 in the suction end cap 200. The inlet opening 518 receives concentrate from the opening 220 leftover from the reverse osmosis process through the membrane 80A. The outer sleeve 510 further includes a groove 520 that extends around a portion of the periphery of the outer sleeve 510 at the top of the outer sleeve as viewed in FIG. 15. The groove 520 is configured to mate with a portion 560 of the flange 550 to secure the outer sleeve 510 to the flange.

The inner sleeve 530 is configured for rotation within and relative to the outer sleeve 510 about the axes 512, 532 when the inner and outer sleeves are connected to the flange 550. The inner sleeve 530 (FIGS. 16C-E) includes a first opening 534 and a second opening 536 that extend entirely through the inner sleeve to an interior 540 of the inner sleeve. An inlet opening 538 extending through the inner sleeve 510 and into the interior 540 is axially and radially aligned with the inlet opening 518 in the outer sleeve 510 and, thus, the inlet opening 540 is in fluid communication with the opening 220 in the suction end cap 200.

Each of the first and second openings 534, 536 has a shape with a variable cross-section, such as a wedge or triangular shape. The first and second openings 534, 536 may have the same shape or different shapes. As shown in FIGS. 15 and 16C-D, the first and second openings 534, 536 may have the same triangular shape and are positioned about the periphery of the inner sleeve 530 such that each of the first and second openings tapers inwardly, i.e., becomes narrower, in a direction extending away from one another around the periphery of the inner sleeve. Alternatively, the first and second openings 534, 536 may have any shape whose width increases in a controlled manner in a radial direction around the inner sleeve 530, e.g., frustoconical, parabolic.

The first opening 534 in the inner sleeve 530 is axially and radially aligned with the first opening 514 in the outer sleeve 510 to form the first orifice 502 (FIG. 15). More specifically, the upper and lower boundary edges of the first orifice 502 are defined by the rectangular opening 514 in the outer sleeve 510 and the lateral boundary edges are defined by the variable cross-section opening 534 in the inner sleeve 530. The second opening 536 in the inner sleeve 530 is axially and radially aligned with the second opening 516 in the outer sleeve 510 to form the second orifice 504. More specifically, the upper and lower boundary edges of the second orifice 504 are defined by the rectangular opening 516 in the outer sleeve 510 and the lateral boundary edges are defined by the variable cross-section opening 536 in the inner sleeve 530. The first and second opening 534, 536 may be defined by edges of the inner sleeve 530 that are raised in the radially outward direction to increase the localized sealing force on the inner surface of the outer sleeve 510 at the resulting orifices 502, 504.

The upper portion of the inner sleeve 530 includes an adjustment device 542 (FIGS. 16C-E) for rotating the inner sleeve to control the radial position of the openings 534, 536 in the inner sleeve relative to the openings 514, 516 in the outer sleeve 510. The adjustment device 542 may receive a tool such as an allen wrench or screwdriver to facilitate rotation of the inner sleeve 530 relative to the outer sleeve 510.

As shown in FIGS. 16F-H, the flange 550 has a generally rectangular shape and receives both the outer sleeve 510 and the inner sleeve 530. A plurality of mounting holes 554 are provided in the flange 550 to secure the flange and, thus, the flow control element 550 to the suction end cap 200 or other portion of the fluid treatment system 30". The flange 550 includes a passage 352 for slidably receiving the adjustment device 542 of the inner sleeve 530 and a projection 560 that mates with the groove 520 on the outer sleeve 510 to secure the outer sleeve to the flange. When the inner sleeve 530 is inserted into the flange 550 a plurality of teeth 544 on the inner sleeve 530 engage a plurality of mating teeth 558 on the flange 550. The adjustment device 542 is axially movable relative to the flange 550 such that the teeth 544 of the inner sleeve are releasably engageable with the teeth 558 of the flange 550 to allow the inner sleeve to move to any one of a plurality of radial positions relative to the flange and the outer sleeve 510.

The flange 550 further includes indicia 556 corresponding with predetermined radial settings or positions of the inner sleeve 530 relative to the outer sleeve 510. The indicia 556 terminate at positions indicated at 557 that correlate with the maximum travel of the adjustment device 542 relative to the outer sleeve 510 and, thus, maximum rotation of the inner sleeve 530 relative to the outer sleeve in either direction.

The flow control element 500 includes structure for limiting rotation of the inner sleeve 530 relative to the outer sleeve 510 to define the radial positions at which the end positions 557 reside. The inner sleeve 530 includes a projection 546 that cooperates with a groove 562 in the flange 550 to limit rotation of the inner sleeve in both the clockwise and counterclockwise directions relative to the outer sleeve 510. When the adjustment device 542 is positioned within the passage 552 of the flange 550 the projection 546 on the inner sleeve is positioned within the grove 562 on the flange. The adjustment device 542 may rotate in either the clockwise or counterclockwise direction relative to the outer sleeve 510 until the projection 546 engages an end stop 564 at either end of the groove 562, thereby preventing additional rotation of the inner sleeve 530 in either direction.

The inner sleeve 530 is rotatable relative to the outer sleeve 510 via the adjustment device 542 to align different portions of the variable cross-section first and second openings 534, 536 in the inner sleeve with the constant cross-section first and second openings 514, 516, respectively, in the outer sleeve. At least a portion of the opening 536 in the inner sleeve 530 is always in radial alignment with a portion, however small, of the opening 516 in the outer sleeve 510. The opening 534, however, is configured such that the opening 534 can be completely out of alignment with the opening 516. Moreover, the inlet openings 518, 538 in the outer and inner sleeves 510, 530 are always at least partially aligned regardless of the radial position of the inner sleeve relative to the outer sleeve. The openings 534, 536 in the inner sleeve 530 are configured such that when the inner sleeve rotates relative to the outer sleeve 510 the size of the openings 534, 536 in the inner sleeve aligned with the openings 514, 516 in the outer sleeve varies.

As the inner sleeve 530 rotates clockwise relative to the outer sleeve 510 in the direction indicated at R (FIG. 5), the size of the portion of the opening 534 aligned with the opening 514 in the outer sleeve increases while the size of the portion of the opening 536 aligned with the opening 516 in the outer sleeve decreases. The change in size of the openings 534, 536 is due to the tapered, non-uniform cross-section of the openings. Likewise, as the inner sleeve 530 rotates counterclockwise relative to the outer sleeve 510 the size of the portion of the opening 534 aligned with the opening 514 in the outer sleeve decreases while the size of the portion of the opening 536 aligned with the opening 516 in the outer sleeve increases.

Alternatively, the orientation of the openings 534, 536 in the inner sleeve 530 may be reversed such that clockwise rotation of the inner sleeve causes the size of the first opening 534 aligned with the opening 514 in the outer sleeve to decrease while the size of the second opening 536 aligned with the opening 516 in the outer sleeve increases, in any case, the total area of the openings 534, 536 aligned with the openings 514, 516 in the outer sleeve 510 remains substantially constant. Since the openings 514, 516 have a fixed cross-section the total area of the orifices 502, 504 is therefore substantially constant. Likewise, the combined fluid resistance through the orifices 502, 504 remains substantially constant regardless of the radial position of the inner sleeve 530 relative to the outer sleeve 510.

The openings 514, 516 and 534, 536 in the sleeves 510 and 530 provide the only means by which fluid may exit the fluid control element 500. The variable cross-section openings 534, 536 in the inner sleeve 530 therefore dictate the flow rate and pressure of fluid flowing to the openings 514, 516 in the outer sleeve 510 and, thus, flow out of the flow control element 500. By aligning larger or smaller sized portions of the openings 534, 536 in the inner sleeve 530 with the uniformly sized openings 514, 516 in the outer sleeve 510 the flow control element 500 provides continuously variable flow proportion outputs.

Since the variable cross-section openings 534, 536 in the inner sleeve 530 provide continuously variable flow proportions through the orifices 502, 504, the adjustment device 542 may be set to any position between and including the end positions 557 of the indicia 556 corresponding with predetermined flow proportions through the flow control device 500. The fineness or amount of mating teeth 544, 558 on the inner sleeve 530 and the flange 550 dictate the amount of positions between the end positions 557 in which the inner sleeve 530 can be locked relative to the outer sleeve 510. As more mating teeth 544, 558 are provided the number of different configurations for the alignment of the openings 534, 536 with the openings 514, 516 increases and, thus, the variability in controlling the flow output through the flow control element 500 increases.

One end position 557 of the indicia 556 correlates with a position at which a predetermined minimum of the opening 536 in the inner sleeve 530 is aligned with the opening 516 in the outer sleeve 510. The other end position 557 of the indicia 556 correlates with a position at which the opening 534 in the inner sleeve 530 is completely out of radial alignment with the opening 514 in the outer sleeve 510. Therefore, the adjustment device 542 can be set to positions in which at least a portion of both openings 534, 536 are aligned with the openings 514, 516 in the outer sleeve 510 or positions in which only the opening 536 is aligned with the opening 516 in the outer sleeve. This ensures that at least some fluid always flows through the orifice 504 to the drain passage 218 regardless of the position of the adjustment device 542 to prevent excessive pressure build up and damage to the membrane 80A.

In operation, the concentrate residue from the membrane 80A flows through the inlet openings 518, 538 into the interior 540 of the inner sleeve 530. The concentrate is then split by the flow control element 500 according to the preset proportion via the adjustment device 542 in order to direct the concentrate out of the flow control element through the first orifice 502, i.e., the aligned openings 514, 534, to the recycling passage 222 in the suction end cap and through the second orifice 504, i.e., the aligned openings 516, 536, to the drain passage 218. Since the adjustment device 542 may vary the flow proportions through each orifice 502, 504 by adjusting the size of the openings 534, 536 in the inner sleeve 530 radially aligned with the openings 514, 516 in the outer sleeve 510 the flow control element 500 may continuously vary the flow proportions to the recycling passage 222 and the drain passage 218 depending on desired performance criterion in accordance with the present invention. As noted, the combined resistances to fluid flow through the orifices 502, 504 remains constant regardless of the particular flow proportions through the orifices dictated by the adjustment device 542.

Fluid pressure within the flow control element 500 biases the inner sleeve 530 into any one of a plurality of locked positions relative to the flange 550 and thus, relative to the outer sleeve 510 to prevent the inner sleeve from drifting relative to the outer sleeve once the desired flow proportions have been set by the adjustment device 542. The teeth 544 on the inner sleeve 530 are biased into engagement with the teeth 558 on the flange 550 such that the inner sleeve can be releasably locked relative to the outer sleeve 510 at an position between and including the end stops 564 dictated by the position of the adjustment device 542. To overcome the bias of the fluid pressure the adjustment device 542 is forced downward slightly to disengage the mating teeth 544, 558 and then rotated accordingly to place the inner sleeve 530 is the desired position relative to the outer sleeve 510. The downward force on the adjustment device 542 is then released to allow the fluid pressure to bias the mating 544, 558 back into engagement with one another, thereby locking the position of the inner sleeve 530 relative to the outer sleeve 510.

In another aspect of the present invention the variable cross-section openings 534, 536 in the inner sleeve 530 may be replaced with a series of spaced-apart openings having incremental sizes (not shown). In this configuration, the flow control element provides discrete variations in flow pressure and rate to the recycling passage 222 and drain passage 218 rather than continuously variable flow pressure and rate. The openings 534, 536 in the discrete flow control element may each constitute a plurality of openings that increase and decrease, respectively, in size around the periphery of the inner sleeve 530 such that the sizes of the aligned openings are inversely related while maintaining a constant total flow area through the flow control element.

The teeth 544 on the inner sleeve 530 and the teeth 558 on the flange 550 are spaced and configured such that the adjustment device 542 can only be locked to the flange in radial positions that place one of the sets of openings 534, 536 in alignment with the openings 514, 516 in the outer sleeve 510 to allow concentrate to flow out of the fluid control element 500. In other words, the inner sleeve 530 cannot be locked in a radial position relative to the outer sleeve 510 that prevents concentrate from exiting the flow control element.

Similar to the variable flow control element the indicia 556 on the discrete flow control element may correlate with predetermined flow pressures and rates to the recycling passage 222 and the drain passage 218 in the suction end cap 200. For example, the indicia 556 may correlate with the relative flow proportions shown in Table 1:

TABLE 1

| Setting | Recirculation | Waste | Total | Efficiency |
|---------|---------------|-------|-------|------------|
| 1 | 3 | 1 | 4 | High |
| 2 | 2.5 | 1.5 | 4 | ... |
| 3 | 2 | 2 | 4 | ... |
| 4 | 1.5 | 2.5 | 4 | Low |

The values in Table 1 represent relative flow proportions of concentrate directed to the recycling passage 222, i.e., recirculation, and concentrate directed to the drain passage 218, i.e., waste, by the orifices 502, 504 in the flow control element. Table 1 illustrates that the cumulative flow of concentrate directed by the discrete flow control element remains constant regardless of the setting or flow proportions.

In use, the adjustment device 542 is depressed slightly to overcome the fluid pressure within the flow control element in order to disengage the mating teeth 544, 558 on the inner sleeve 530 and the flange 550. The adjustment device 542 is then rotated to vary the site of the discrete openings 534, 536 in the inner sleeve 530 aligned with the openings 514, 516 in the outer sleeve 510 until a desired flow pressure and rate through the orifices 502, 504 is achieved. Visual verification of the flow proportion through the orifices 502, 504 is achieved via the indicia 556. The downward force on the adjustment device 542 is then released to allow the fluid pressure in the flow control element to bias the teeth 544 of the inner sleeve 530 back into engagement with the teeth 558 on the flange 550. The inner sleeve 530 is thereby locked in a desired radial position relative to the outer sleeve 530 corresponding with desired concentrate flow proportions to the recycling passage 222 and the drain passage 218 in the suction end cap 200.

Figure 17:
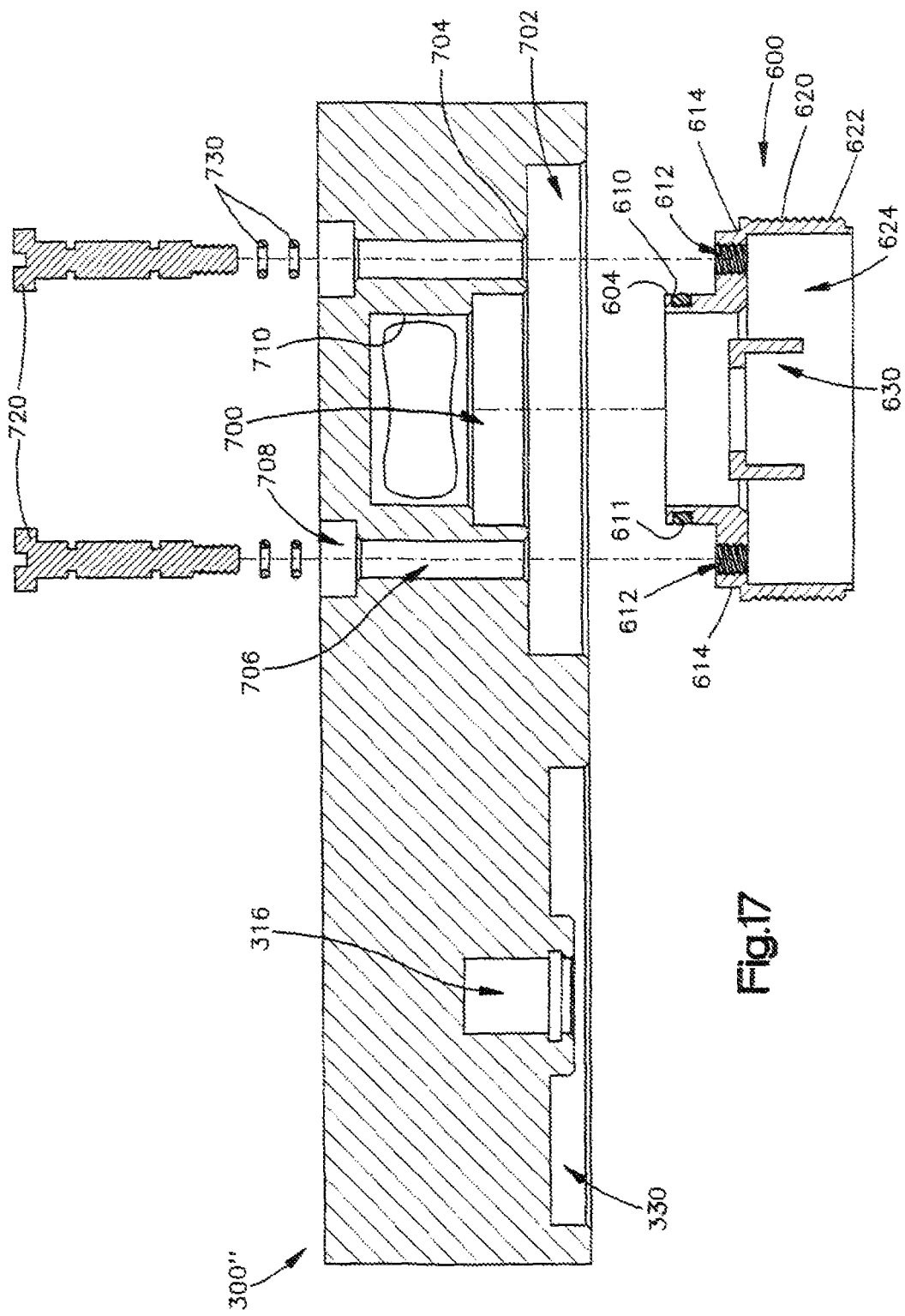
FIG. 17 is a section view of a pressure end cap in accordance with another aspect of the present invention.

FIGS. 17-18 illustrate a pressure end cap 300" in accordance with another aspect of the present invention. In FIGS. 17-18 a pump end bell or adapter 600 is used to secure the pump 48 to the pressure end cap 300" instead of the threaded pump connection hole 304 illustrated in FIG. 7D. The adapter 600 is configured to provide resistance to rotation of the pump 48 relative to the pressure end cap 300".

The adapter 600 has a cylindrical shape that includes a head portion 604 and a body portion 620. The head portion 604 includes an annular recess 610 for receiving an o-ring or seal 611 to help seal the adapter 600 within the pressure end cap 300". At least a pair of projections or shoulders 614 extends from the body portion 620. Each shoulder 614 includes a threaded passage 612 that extends through the body portion 620 into an inner chamber 624 defined by the body port on. The outer surface of the body portion 620 includes threads 622 configured to threadably engage a casing of the pump 48 in order to seal against water leakage and resist/inhibit unscrewing of the pump casing from die adapter 600. A cylindrical retaining portion 630 is positioned within the inner chamber 624 of the body portion 620 and is configured to receive a portion of the pump 48 in order to further secure the pump to the adapter 600.

The head portion 604 of the adapter 600 is received in a first cavity 700 in the pressure end cap 300" and the body portion 620 of the adapter is received in a second cavity 702. The first cavity 700 and second cavity 702 are in fluid communication with the connection passage 334 leading to the membrane 80 and the permeate rinse passage 314 (not shown). Together, the surfaces defining the first and second cavities 700, 702 in the pressure end cap 300" substantially mirror and mate with the head portion 604 and the body portion 620 of the adapter 600 to prevent relative rotation between the pressure end cap 300 and the adapter 600 and thus, between the pressure end cap 300 and the pump 48 securely fixed to the adapter.

A series of passages 706 having a counterbore 708 extend through the pressure end cap 300" and are configured to correspond with the number and positioning of the threaded passages 612 in the adapter 600. The passages 706 terminate at recesses or surfaces 704 of the pressure end cap 300" configured to mate with the shoulders 614 on the adapter 600 to prevent relative rotation between the adapter, the pump 48, and the pressure end cap 300".

To secure the adapter 600 to the pressure end cap 300", the head portion 604 is positioned within the first cavity 702 in the pressure end cap such that the seal 611 in the annular recess 610 seals with a surface 710 defining the first cavity. A plurality of fasteners 720, such as threaded bolts, are fed through the passages 706 in the pressure end cap 300" and threaded into the threaded passages 612 in the adapter 600 until the head of each fastener abuts the counterbore 708 of the passage to securely fix the pressure end cap to the adapter. O-rings or seals 730 may be positioned around the shanks of the fasteners 730 to help seal the connection between the fasteners and the passages 706 in the pressure end cap 300 and allow a small amount of axial free play of the pump 48.

When the adapter 600 is secured to the pressure end cap 300" the pump 48 in is fluid communication with the inner chamber 624 of the adapter 600, which fluidly communicates with the first cavity 700 in the pressure end cap and, thus, fluidly communicates with the connection passage 334 leading to the membrane 80. The pump 48 may thereby pump the incoming feed water through the adapter 600, through the pressure end cap 300" and into the second tube 150 having the membrane 80 therein.

From the above description of the invention, those skilled in the art will perceive improvements, changes and modifications. Such improvements, changes and modifications within the skill of the art are intended to be covered by the appended claims.

The invention claimed is:

1. A fluid treatment system for treating feed water comprising:
   a first tubular member having first and second ends;
   at least one second tubular member having first and second ends;
   a pump positioned within the first tubular member;
   a filtering membrane positioned within the second tubular member and receiving water to be treated from the pump;
   a first end cap for receiving the first ends of the first and second tubular members and including a passage for fluidly connecting the first ends of the first and second tubular members together; and
   a second end cap for receiving the second ends of the first and second tubular members and including a passage for fluidly connecting the second ends of the first and second tubular members together.

2. The fluid treatment system recited in claim 1 wherein the first and second end caps cooperate to fluidly seal the first and second ends of the first tubular member and the second tubular member.

3. The fluid treatment system recited in claim 1 wherein one of the first and second end caps includes structure for supporting the pump in a vertical position.

4. The fluid treatment system recited in claim 1 wherein the first end cap includes:
   a feed passage for placing the pump in fluid communication with feed water;
   a drain passage for placing the second tubular member in fluid communication with a drain; and
   a permeate passage for placing the filtering membrane in fluid communication with a storage tank.

5. The fluid treatment system recited in claim 4 further comprising a recycling passage for placing the second tubular member in fluid communication with the first tubular member.

6. The fluid treatment system recited in claim 1 wherein the second end cap includes a connection passage for placing the pump in fluid communication with the filtering membrane, and a permeate rinse passage for placing the filtering membrane in fluid communication with a storage tank.

7. The fluid treatment system recited in claim 1 wherein the filtering membrane is one of a reverse osmosis membrane and a nanofilter membrane.

8. The fluid treatment system recited in claim 1 wherein the first and second end caps are configured so that the tubular members can be supported either in a vertical orientation or a horizontal orientation.

9. The fluid treatment system recited in claim 1 wherein at least one of the end caps serves as a mounting for a pressure sensor and a temperature sensor and includes passages communicating with the sensors.

10. The fluid treatment system recited in claim 1 wherein at least one of the end caps defines an internal connection passage for communicating an output of the pump with the filtering membrane in the second tubular member.

11. The fluid treatment system recited in claim 1 wherein at least one of the end caps includes a removable portion by which access to the filtering membrane is provided without the need for removing the one end cap from the second tubular member.

12. The fluid treatment system recited in claim 1 wherein the first and second tubular members are the same length.

13. The fluid treatment system recited in claim 1 wherein the first and second tubular members have the same diameter.

14. The fluid treatment system recited in claim 1 wherein the first and second tubular members extend parallel to one another.

15. A fluid treatment system, comprising:
   a) a filtering membrane located within a first tubular member for receiving water to be treated;
   b) a pump for delivering water to be treated to the filtering membrane, the pump located within a second tubular member;
   c) each of the tubular members having first and second ends;
   d) the first and second ends of each tubular member being received by respective first and second end caps, at least one of the end caps defining an internal passage for fluidly communicating the pump with the filtering membrane; and
   e) at least of the end caps serving as a mounting for temperature and pressure sensors that monitor the temperature and pressure of water to be treated, the sensors communicating with associated fluid passages defined within the one end cap.

16. The fluid treatment system of claim 15 wherein at least one of the end caps defines:
   a passage for communicating water to be treated to the filtering membrane,
   a passage for receiving concentrate from the membrane,
   a drain passage for communicating with the concentrate passage, and
   a passage for receiving permeate from the membrane, one of the end caps further defining a passage for delivering at least a portion of the concentrate to the pump, for recycling.

17. The fluid treatment system of claim 16 wherein the one end cap mounts a restrictor in the recycling passage and a restrictor in the drain passage.

18. The fluid treatment system of claim 16 wherein the one end cap mounts an adjustable restrictor for concurrently adjusting a flow restriction in the recycling passage and the drain passage, the adjustable flow restrictor including:
   a) an outer sleeve having a first opening in fluid communication with the recycling passage and a second opening in fluid communication with the drain passage; and
   b) an inner sleeve positioned within and rotatable relative to the outer sleeve, the inner sleeve having a first opening and a second opening, the first openings of the inner and outer sleeves defining an adjustable first orifice for varying the resistance to flow to the recycling passage, the second openings of the inner and outer sleeves defining an adjustable second orifice for varying the resistance to flow to the drain passage.

19. The fluid treatment system of claim 18 wherein the first and second openings of the inner sleeve have a non-uniform cross section to provide a continuously variable resistance to flow through the first orifice and the second orifice.

20. The fluid treatment system of claim 18 wherein each of the first and second openings of the inner sleeve comprise a series of discrete openings to provide a discrete variance to resistance to flow through the first orifice and the second orifice.

21. The fluid treatment system of claim 18 wherein the combined fluid resistance through the first and second orifices remains substantially constant.

22. The fluid treatment system recited in claim 16 wherein the permeate passage places the membrane in fluid communication with one of a hydropneumatic tank or atmospheric storage tank.

23. The fluid treatment system recited in claim 15 further comprising a temperature sensor for monitoring the temperature of the feed water flowing between the first tubular member and the second tubular member.

24. A fluid treatment system for treating feed water comprising:
   a first tubular member having first and second ends;
   a second tubular member having first and second ends;
   a pump positioned within the first tubular member;
   a filtering membrane positioned within the second tubular member;
   a first end cap for receiving the first end of the first tubular member;
   a second end cap for receiving the second end of the first tubular member; and
   an adapter for securing the pump to the first end cap and preventing relative rotation between the pump and the first end cap, the adapter including a plurality of shoulders that mate with recessed portions of the first end cap.

25. The fluid treatment system of claim 24, wherein the adapter suspends the pump from the first end cap.

26. The fluid treatment system recited in claim 9 wherein the pressure sensor and temperature sensor monitor the temperature and pressure of water communicated by the pump to one of the first end cap and the second end cap.

27. The fluid treatment system recited in claim 1 wherein the at least one second tubular member comprises a plurality of second tubular members, a filtering membrane being positioned in each of the second tubular members, the first end cap receiving the first end of each first and second tubular member and fluidly connecting the first ends of the first and second tubular members together, the second end cap receiving the second end of each first and second tubular member and fluidly connecting the second ends of the first and second tubular members together.

28. The fluid treatment system of claim 18, wherein the first and second openings in the outer sleeve extend through the periphery of the outer sleeve and the first and second openings in the inner sleeve extend through the periphery of the inner sleeve.

29. The fluid treatment system of claim 28, wherein the degree to which the first openings of the inner and outer sleeves are radially aligned with one another is adjustable for varying the resistance to flow through the first orifice to the recycling passage.

30. The fluid treatment system of claim 28, wherein the degree to which the second openings of the inner and outer sleeves are radially aligned with one another is adjustable for varying the resistance to flow through the second orifice to the drain passage.

31. The fluid treatment system of claim 28, wherein the degree to which the first openings of the inner and outer sleeves are radially aligned with one another is adjustable for varying the resistance to flow through the first orifice to the recycling passage, the degree to which the second openings of the inner and outer sleeves are radially aligned with one another being adjustable for varying the resistance to flow through the second orifice to the drain passage.

32. The fluid treatment system of claim 31, wherein the radial alignment of the first openings and the radial alignment of the second openings are adjustable simultaneously.

\* \* \* \* \*